US007074127B2

(12) United States Patent

Cuddy et al.

(10) Patent No.: US 7,074,127 B2

(45) Date of Patent: *Jul. 11, 2006

(54) GAMING DEVICE HAVING A PROBABILITY-ENHANCING TRIGGER SYMBOL

(75) Inventors: Ryan W. Cuddy, Reno, NV (US); Erick T. Ching, Reno, NV (US); Jasonlee Kissee Hohman, Sparks, NV (US)

(73) Assignee: IGT, Reno, NV (US)

( * ) Notice: Subject to any disclaimer, the term of this patent is extended or adjusted under 35 U.S.C. 154(b) by 339 days.

This patent is subject to a terminal disclaimer.

(21) Appl. No.: 10/661,443

(22) Filed: Sep. 12, 2003

(65) Prior Publication Data

US 2004/0137982 A1 Jul. 15, 2004

Related U.S. Application Data

(63) Continuation-in-part of application No. 10/241,255, filed on Sep. 11, 2002.

(51) Int. Cl.
*A63F 13/00* (2006.01)

(52) U.S. Cl. .................................................. 463/20

(58) Field of Classification Search .................. 463/16, 463/20; 273/143 R See application file for complete search history.

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,838,552 | A | 6/1989 | Hagiwara |
| 4,991,848 | A | 2/1991 | Greenwood et al. |
| 5,085,436 | A | 2/1992 | Bennett |
| 5,102,134 | A | 4/1992 | Smyth |
| 5,308,065 | A | 5/1994 | Bridgeman et al. |
| 5,332,228 | A | 7/1994 | Schultz |
| 5,393,057 | A | 2/1995 | Marnell, II |
| 5,393,061 | A | 2/1995 | Manship et al. |
| 5,407,200 | A | 4/1995 | Zalabak |
| 5,423,539 | A | 6/1995 | Nagao |
| 5,431,408 | A | 7/1995 | Adams |
| 5,449,173 | A | 9/1995 | Thomas et al. |
| 5,542,669 | A | 8/1996 | Charron et al. |

(Continued)

FOREIGN PATENT DOCUMENTS

AU 199717601 B2 9/1997

(Continued)

OTHER PUBLICATIONS

The Basics of Winning Video Poker (Chapter VI Deuces Wild & Chapter VII Jokers Wild) written by J. Edward Allen, published in 1990.

(Continued)

*Primary Examiner*—Kim Nguyen

(74) *Attorney, Agent, or Firm*—Bell, Boyd & Lloyd LLC

(57) ABSTRACT

A gaming device including a re-initiation mode wherein the probability of extending the bonus game is increased by fixing the reel or reels displaying a wild symbol on the reel. In the re-initiation mode embodiment, the gaming device re-activates some or all of the reels except the reel displaying the wild symbol for a predetermined number of free spins or until the reactivated reels display or indicate a wild symbol on the reels. The gaming device provides any outcomes associated with indicated symbols or combination of symbols. In one embodiment, if a predetermined number of wild symbols are displayed on designated reels, the gaming device re-initiates the bonus game.

34 Claims, 15 Drawing Sheets

U.S. PATENT DOCUMENTS

| | | | |
|---|---|---|---|
| 5,560,603 A | 10/1996 | Seelig et al. | |
| 5,569,084 A | 10/1996 | Nicastro et al. | |
| 5,647,798 A | 7/1997 | Falciglia | |
| 5,722,891 A | 3/1998 | Inoue | |
| 5,772,506 A | 6/1998 | Marks et al. | |
| 5,775,692 A | 7/1998 | Watts et al. | |
| 5,810,361 A | 9/1998 | Kadlic | |
| 5,823,873 A | 10/1998 | Moody | |
| 5,833,537 A | 11/1998 | Barrie | |
| 5,855,514 A | 1/1999 | Kamille | |
| 5,918,880 A | 7/1999 | Voigt, IV et al. | |
| 5,935,002 A | 8/1999 | Falciglia | |
| 5,964,463 A | 10/1999 | Moore, Jr. | |
| 5,971,849 A | 10/1999 | Falciglia | |
| 5,988,638 A | 11/1999 | Rodesch et al. | |
| 6,003,867 A | 12/1999 | Rodesch et al. | |
| 6,004,207 A | 12/1999 | Wilson, Jr. et al. | |
| 6,012,982 A | 1/2000 | Piechowiak et al. | |
| 6,033,307 A | 3/2000 | Vancura | |
| 6,059,289 A | 5/2000 | Vancura | |
| 6,059,658 A | 5/2000 | Mangano et al. | |
| 6,089,977 A | 7/2000 | Bennett | |
| 6,102,400 A | 8/2000 | Scott et al. | |
| 6,120,031 A | 9/2000 | Adams | |
| 6,142,873 A | 11/2000 | Weiss et al. | |
| 6,142,874 A | 11/2000 | Kodachi et al. | |
| 6,142,875 A | 11/2000 | Kodachi et al. | |
| 6,155,925 A | 12/2000 | Giobbi et al. | |
| 6,159,095 A | 12/2000 | Frohm et al. | |
| 6,159,096 A | 12/2000 | Yoseloff | |
| 6,159,097 A | 12/2000 | Gura | |
| 6,173,955 B1 | 1/2001 | Perrie et al. | |
| 6,174,233 B1 | 1/2001 | Sunaga et al. | |
| 6,186,894 B1 | 2/2001 | Mayeroff | |
| 6,190,254 B1 | 2/2001 | Bennett | |
| 6,203,429 B1 | 3/2001 | Demar et al. | |
| 6,220,959 B1 | 4/2001 | Holmes, Jr. et al. | |
| 6,224,483 B1 | 5/2001 | Mayeroff | |
| 6,231,442 B1 | 5/2001 | Mayeroff | |
| 6,231,445 B1 | 5/2001 | Acres | |
| 6,234,897 B1 | 5/2001 | Frohm et al. | |
| 6,251,013 B1 | 6/2001 | Bennett | |
| 6,270,409 B1 | 8/2001 | Shuster | |
| 6,270,411 B1 | 8/2001 | Gura et al. | |
| 6,290,600 B1 * | 9/2001 | Glasson | 463/20 |
| 6,299,165 B1 | 10/2001 | Nagano | |
| 6,299,170 B1 | 10/2001 | Yoseloff | |
| 6,302,398 B1 | 10/2001 | Vecchio | |
| 6,305,686 B1 | 10/2001 | Perrie et al. | |
| 6,311,976 B1 | 11/2001 | Yoseloff et al. | |
| 6,312,334 B1 | 11/2001 | Yoseloff | |
| 6,315,660 B1 | 11/2001 | DeMar et al. | |
| 6,315,663 B1 | 11/2001 | Sakamoto | |
| 6,319,124 B1 | 11/2001 | Baerlocher et al. | |
| 6,322,078 B1 | 11/2001 | Adams | |
| 6,340,158 B1 | 1/2002 | Pierce et al. | |
| 6,358,144 B1 | 3/2002 | Kaddlic et al. | |
| 6,364,768 B1 | 4/2002 | Acres et al. | |
| 6,375,570 B1 | 4/2002 | Poole | |
| 6,394,902 B1 | 5/2002 | Glavich et al. | |
| 6,398,218 B1 | 6/2002 | Vancura | |
| 6,398,644 B1 | 6/2002 | Perrie et al. | |
| 6,413,162 B1 | 7/2002 | Baerlocher et al. | |
| 6,419,579 B1 | 7/2002 | Bennett | |
| 6,439,943 B1 | 8/2002 | Aoki et al. | |
| 6,439,993 B1 | 8/2002 | O'Halloran | |
| 6,443,452 B1 | 9/2002 | Brune | |
| 6,454,266 B1 | 9/2002 | Breeding et al. | |
| 6,461,241 B1 | 10/2002 | Webb et al. | |
| 6,471,208 B1 | 10/2002 | Yoseloff et al. | |
| 6,481,713 B1 | 11/2002 | Perrie et al. | |
| 6,491,584 B1 * | 12/2002 | Graham et al. | 463/25 |
| 6,494,454 B1 | 12/2002 | Adams | |
| 6,537,150 B1 | 3/2003 | Luciano et al. | |
| 6,537,152 B1 | 3/2003 | Seelig et al. | |
| 6,561,904 B1 | 5/2003 | Locke et al. | |
| 6,565,436 B1 | 5/2003 | Baerlocher | |
| 6,602,137 B1 | 8/2003 | Kaminkow et al. | |
| 6,604,740 B1 | 8/2003 | Singer et al. | |
| 6,616,142 B1 | 9/2003 | Adams | |
| 6,632,139 B1 | 10/2003 | Baerlocher | |
| 6,712,694 B1 | 3/2004 | Nordman | |
| 6,733,389 B1 | 5/2004 | Webb et al. | |
| 6,805,349 B1 | 10/2004 | Baerlocher et al. | |
| 6,869,360 B1 | 3/2005 | Marks et al. | |
| 6,905,406 B1 | 6/2005 | Kaminkow et al. | |
| 6,913,532 B1 | 7/2005 | Baerlocher et al. | |
| 6,921,335 B1 | 7/2005 | Rodgers et al. | |
| 2001/0009865 A1 | 7/2001 | Demar et al. | |
| 2002/0010017 A1 | 1/2002 | Bennett | |
| 2003/0060272 A1 | 3/2003 | Glavich et al. | |
| 2003/0069062 A1 | 4/2003 | Shimizu | |
| 2003/0073483 A1 | 4/2003 | Glavich et al. | |
| 2003/0162585 A1 | 8/2003 | Bigelow et al. | |
| 2003/0203753 A1 | 10/2003 | Muir et al. | |
| 2004/0002372 A1 | 1/2004 | Rodgers et al. | |
| 2004/0038731 A1 | 2/2004 | Englman | |
| 2004/0048652 A1 * | 3/2004 | Ching et al. | 463/20 |
| 2004/0053666 A1 | 3/2004 | Vancura | |
| 2004/0053669 A1 | 3/2004 | Gerrard et al. | |
| 2004/0053672 A1 | 3/2004 | Baerlocher | |
| 2004/0072612 A1 | 4/2004 | Rodgers et al. | |
| 2004/0137982 A1 | 7/2004 | Cuddy et al. | |
| 2004/0147306 A1 | 7/2004 | Randall et al. | |
| 2004/0266516 A1 | 12/2004 | Bleich et al. | |
| 2004/0266517 A1 | 12/2004 | Thomas | |
| 2005/0049035 A1 | 3/2005 | Baerlocher et al. | |
| 2005/0070354 A1 | 3/2005 | Baerlocher et al. | |

FOREIGN PATENT DOCUMENTS

| | | | |
|---|---|---|---|
| AU | 199917318 | A1 | 9/1999 |
| EP | 0 874 337 | A1 | 10/1998 |
| EP | 0 981 119 | A2 | 2/2000 |
| EP | 0984408 | A2 | 3/2000 |
| EP | 1 513 117 | A2 | 3/2005 |
| GB | 2 322 217 | A | 8/1998 |
| WO | WO 9732285 | | 9/1997 |
| WO | WO 00/32286 | | 6/2000 |
| WO | WO 00/66235 | | 11/2000 |
| WO | WO 00/76606 | A1 | 12/2000 |
| WO | WO 01/26019 | A1 | 4/2001 |
| WO | WO 2004/025584 | A2 | 3/2004 |

OTHER PUBLICATIONS

Boot Scootin Article written by Strictly Slots/Aristocrat Leisure Industries, PTY Ltd., published date unknown.
Black Swan Paytable Display written by IGT, published prior to 2001.
Break the Spell Advertisement written by Atronic Casino Technology, Ltd., published in 1999.
Break the Spell Article written by Strictly Slots/Atronic Casino Technology, Ltd., published in Sep. 2000.
Break the Spell Atronic Web Page, published in Jan. 2001.
Break the Spell Brochure, published in 1999.
Cash Chameleon Article written by Strictly Slots/Aristocrat Leisure Industries, PTY Ltd., published in Apr. 2001.
Catch A Wave Advertisement written by IGT, published in Dec. 2000.
Cossack Dance Advertisement written by Olympic Video Gaming, published prior to 2002.

Double Diamond Line Advertisement written by Bally Gaming Systems, published in 2000.
Enchanted Forest™ Gaming Description from Aristocrat, available in 1994.
Enchanted Unicorn Advertisement written by IGT, published in 2001.
Field Testing New Slots Article, written by Strictly Slots, published in Jul. 2000.
Fishin' Buddies Article published in Strictly Slots/Anchor Games, published in Apr. 2001.
Happy Camper Advertisement written by IGT, published in 2001.
Introducing the "Smiling Ape" Machine Advertisement (including Joker's Wild Poker description) written by IGT, published prior to 2001.
Jackpot Party Brochure and Articles written by WMS Gaming, Inc, published in 1988.
Joker's Wild Advertisement written by IGT, published prior to 2001.
The Latest Buzz Article written by Bally Gaming Systems, published in Fall 2000.
Little Green Men, Jr. Advertisement written by A.C. Coin and Slot Services Company, published prior to 2002.
Loco Loot Article written by Strictly Slots/Aristocrat Leisure Industries, PTY Ltd., published in May 2002.
Mountain Money Article written by Strictly Slots/Aristocrat Leisure Industries, PTY Ltd., published in Jun. 2002.
On the House Advertisement written by Olympic Video Gaming, published prior to 2002.
Penguin Pays Advertisement written by Aristocrat Incorporated, published in 1998.
Reel Magic™ Gaming Machine Description written by IGT, available in 1986.
Symbol Feature Description in Australian UFO Gaming Machine written by Barcrest Ltd., published in 1995.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, published date unknown.
Family Feud Bullseye advertisement, printed from www.igtonline.com/megajackpots/new__games/family__feud__bullseye__slots.html on Mar. 2, 2005 and available in 2003.
Dolphin Treasure Advertisement written by Aristocrat Leisure Industries Pty., Ltd., published in 1996.
Spin Til You Win Game Description written by IGT, published in 1996.

* cited by examiner

| SYMBOL COMBINATION | AWARD |
|---|---|
| AAA | 10,000 |
| BBB | 1000 |
| CCC | 500 |
| DDD | 100 |
| EEE | 75 |
| FFF | 50 |
| GGG | 25 |
| HHH | 10 |
| WILD WILD WILD | 10 |
| ◇ ◇ ◇ | 5 |

FIG. 4A

| SYMBOL COMBINATION | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|
| AAA | 1/20 | 1/20 | 1/20 | 1/8000 |
| BBB | 1/20 | 1/20 | 1/20 | 1/8000 |
| CCC | 1/20 | 1/20 | 1/20 | 1/8000 |
| DDD | 1/20 | 1/20 | 1/20 | 1/8000 |
| EEE | 1/20 | 1/20 | 1/20 | 1/8000 |
| FFF | 1/20 | 1/20 | 1/20 | 1/8000 |
| GGG | 1/20 | 1/20 | 1/20 | 1/8000 |
| HHH | 1/20 | 1/20 | 1/20 | 1/8000 |
| WILD WILD WILD | 1/20 | 1/20 | 1/20 | 1/8000 |
| ◇ ◇ ◇ | 1/20 | 1/20 | 1/20 | 1/8000 |
| ▭ ▭ ▭ | 10/20 | 10/20 | 10/20 | 1/8 |

FIG. 4B

| SYMBOL | PROBABILITY OF THE TRIGGER SYMBOL | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|---|
| A | 1/20 | | 1/9 | | 1/180 |
| B | 1/20 | | 1/9 | | 1/180 |
| C | 1/20 | | 1/9 | | 1/180 |
| D | 1/20 | | 1/9 | | 1/180 |
| E | 1/20 | | 1/9 | | 1/180 |
| F | 1/20 | | 1/9 | | 1/180 |
| G | 1/20 | | 1/9 | | 1/180 |
| H | 1/20 | | 1/9 | | 1/180 |
| WILD | 1/20 | | 1/9 | | 1/180 |

GAMING DEVICE HAVING A PROBABILITY-ENHANCING TRIGGER SYMBOL

PRIORITY CLAIM

This application is a continuation-in-part of and claims the benefit of U.S. application Ser. No. 10/241,255, filed on Sep. 11, 2002.

CROSS REFERENCE TO RELATED APPLICATIONS

This application is related to the following commonly-owned patent applications:"GAMING DEVICE HAVING A RE-TRIGGER SYMBOL BONUS SCHEME." Ser. No. 09/981,133, now U.S. Pat. No. 6,913,532; "GAMING DEVICE HAVING DUAL EVALUATION SCHEME," Ser. No. 09/687,689, "GAMING DEVICE HAVING REGENERATING MULTIPLE AWARD OPPORTUNITIES," Ser. No. 09/960,784, "GAMING DEVICE HAVING TRANSFORMABLE WILD SYMBOLS OR CARDS WITH WILD SIGNAL INDICATORS," Ser. No. 09/957,305, now U.S. Pat. No. 6,780,109; "GAMING DEVICE HAVING WILD INDICATORS," Ser. No. 09/960,883, "GAMING DEVICE WITH WILD ACTIVATION SYMBOLS AND WILD TERMINATION SYMBOLS," Ser. No. 09/964,102, now U.S. Pat. No. 6,805,349; "GAMING DEVICE HAVING FREE GAMES BONUS WITH A CHANGING MULTIPLIER," Ser. No. 10/086,146, "GAMING DEVICE HAVING A BONUS GAME WITH MULTIPLE PLAYER SELECTABLE AWARD OPPORTUNITIES," Ser. No. 10/237,207, "GAMING DEVICE HAVING A RE-TRIGGERING SYMBOL BONUS SCHEME WITH A BONUS SYMBOL ACCUMULATOR," Ser. No. 10/071,441, "GAMING DEVICE HAVING RESULTANT WILD SYMBOLS," Ser. No. 10/191,154, "GAMING DEVICE HAVING EXTENDER SYMBOLS," Ser. No. 10/191,197, ; "GAMING DEVICE INCLUDING A GAME HAVING PLAYER SELECTED FUNCTION BASED ON SYMBOLS IN A FREE SPINS GAME," Ser. No. 10/243,052, "GAMING DEVICE HAVING A PROBABILITY ENHANCING TRIGGER SYMBOL," Ser. No. 10/241,255, "GAMING DEVICE INCLUDING A GAME HAVING A WILD SYMBOL RELATED AWARD," Ser. No. 10/633,391, "GAMING DEVICE HAVING A BONUS GAME WITH MULTIPLE PLAYER SELECTABLE AWARD OPPORTUNITIES," Ser. No. 10/660,076, "GAMING DEVICE HAVING SEQUENTIAL ACTIVATIONS OF A GAME AND REPLAY OF PREVIOUS ACTIVATIONS OF THE GAME," Ser. No. 10/956,508, "GAMING DEVICE WITH CHANGING WILD SYMBOLS," Ser. No. 10/956,303, "GAMING DEVICE HAVING FREE SPIN MODE WITH SYMBOL ELIMINATION," Ser. No. 10/953,818, "GAMING DEVICE HAVING A FREE SPIN GAME," Ser. No. 10/953,812, "GAMING DEVICE HAVING A RE-TRIGGERING SYMBOL BONUS SCHEME WITH A BONUS SYMBOL ACCUMULATOR AND PLAYER SELECTION OF ACCUMULATION TOTAL," Ser. No. 10/952,656, "GAMING DEVICE HAVING TRANSFORMABLE WILD SYMBOLS OR CARDS WITH WILD SIGNAL INDICATORS," Ser. No. 10/920,798, "GAMING DEVICE HAVING WILD INDICATORS," Ser. No. 11/015,842, "GAMING DEVICE HAVING WILD INDICATORS," Ser. No. 10/982,096, "GAMING DEVICE WITH WILD ACTIVATION SYMBOLS AND WILD TERMINATION SYMBOLS." Ser. No. 10/966,223, and "GAMING DEVICE HAVING A RE-TRIGGER SYMBOL BONUS SCHEME," Ser. No. 11/156,112.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players have more opportunities to receive an award.

In known gaming devices, however, the probability of obtaining the largest award (i.e., the jackpot award) is typically much lower than the probability of obtaining the other awards in a game. Thus, although a player may obtain more awards in a game, these awards are generally the relatively small awards and not the relatively large awards such as the jackpot award.

Many jurisdictions have regulations that prohibit changing the probability of occurrence associated with the reel symbols. This makes it more difficult to create bonus or secondary games with high payouts using the bonus game reels and reel symbols.

Gaming devices that increase the probability of obtaining the relatively large award and specifically, the jackpot award, are desirable. To increase player enjoyment and excitement, it is desirable to provide new games and gaming devices which increase the likelihood or probability that the player will obtain one or more relatively large awards in a game.

SUMMARY OF THE INVENTION

The present invention is directed to a gaming device including an award mode and a re-initiation mode of a primary game or bonus game where the probability of obtaining an award or an outcome and, specifically, a relatively large award increases when the player enters the award mode or the re-initiation mode of the bonus game.

In one embodiment, the gaming device includes a plurality of reels, each having a plurality of symbols. These symbols include a plurality of award symbols, at least one non-award symbol or null symbol or blank, at least one trigger symbol or symbol combination, and at least one wild symbol. One or more paylines are associated with the reels to indicate symbols or symbol combinations on the reels which are evaluated for winning symbol combinations. The symbols may be any suitable symbols such as letters, numbers, characters or any other suitable images. The award mode also includes a triggering event which, in one embodiment, includes a trigger symbol occurring on the reels. In one embodiment, the triggering event occurs when the trigger symbol is indicated on a designated reel on one of the paylines associated with the reels. In another embodiment, the triggering event occurs when the trigger symbol occurs on any of the paylines.

In a primary game, the gaming device initiates the award mode when the triggering event occurs in the game. In the award mode, the gaming device holds the reel including the trigger symbol stationary while activating or spinning the other reels until those reels indicate a wild symbol on the payline. The gaming device then holds the reels including the wild symbols stationary while reactivating or re-spinning the reel including the trigger symbol. Thus, the award mode effectively reduces the game to a single reel game where only one of the award symbols on the reel indicates a winning symbol combination in the award mode.

In the award mode, the gaming device re-activates or re-spins the reel including the trigger symbol until one of the award symbols is indicated on the payline on that reel. For instance, if a non-award or null symbol, or the trigger symbol is indicated on the payline in the award mode, the gaming device re-spins the reel until one of the award symbols or the wild symbol is indicated on the payline. The null symbols and the trigger symbol do not provide an award to the player in the award mode but, instead, cause the gaming device to re-spin the reels. Therefore, the player is guaranteed to receive one of the award symbols or the wild symbol in the award mode before the award mode ends. Reducing the number of symbols that may be indicated on the payline to end the game, increases the probability that any one of the award symbols will be indicated on the payline. The gaming device then provides the award associated with the indicated award symbol or the indicated award symbol combination to the player. The award is added to the player's total award in a total award display and the bonus mode ends. In another embodiment, the player continues to re-activate the reels in the award mode if the player has spins remaining in the award mode.

The gaming device of the present invention effectively reduces the game to a single reel game or event which increases the probability or chance that a player will obtain an award in the award mode and, specifically, that the player will obtain a relatively large award such as a jackpot award in the award mode. For example, in a three-reel slot game, if each of the reels in the game includes twenty symbols including the trigger symbol, wild symbol, and non-award or null symbols, the probability or chance of obtaining an award symbol combination in that game is (1/20)×(1/20)×(1/20) or 1 in 8000.

In the award mode the game is reduced to a single reel game as described above. Therefore, the probability of obtaining an award symbol (or symbol combination) in the award mode significantly increases. The probability is determined by multiplying the probability of the trigger symbol being indicated in the primary game (i.e., 1 in 20) by the probability of indicating one of the award symbols occurring in the award mode (i.e., 1 in 9). Therefore, the probability of one of the award symbols (or symbol combinations) being indicated in the game (through the award mode) is (1/20)×(1/9), which equals a probability of (1/180). Thus, it is significantly more likely that the player will obtain one of the award symbols and, therefore, a winning award symbol combination in the game through the award mode. This increases the player's excitement and enjoyment of the game because the player has a greater opportunity or probability of obtaining the relatively large award or jackpot award in the award mode.

In one embodiment, a probability of being indicated on the payline is associated with each of the symbols on the reels. In one aspect of this embodiment, the probability associated with the trigger symbol is less than the probability associated with at least one of the award symbols, null symbols and the wild symbol on the reels. In another aspect of this embodiment, the probability associated with the trigger symbol is less than a plurality of the probabilities associated with the award symbols, null symbols and the wild symbol. In a further aspect of this embodiment, the probability associated with the trigger symbol is less than all of the probabilities associated with the award symbols, null symbols and the wild symbol in the game.

Similarly, in another embodiment, the award symbols include one relatively large award and several relatively small awards. In this embodiment, a probability of being indicated on the payline is associated with the award symbols such that the probability associated with the award symbol including the relatively large award is less than at least one of the probabilities associated with the award symbols including the relatively small awards being indicated on the payline. In another embodiment, the probability associated with the award symbol including the relatively large award is less than a plurality of the probabilities associated with the award symbols including the relatively small awards. In a further embodiment, the probability associated with the award symbol including the relatively large award is less than all of the probabilities associated with the award symbols including the relatively small awards.

In a further embodiment, the award mode of the present invention includes an award associated with a winning symbol combination including all wild symbols. In this embodiment, if the award mode is initiated and a wild symbol is indicated on the payline associated with the reels, in combination with the other wild symbols indicated on the payline, the gaming device provides the maximum or largest award in the game, such as the jackpot award. In another embodiment, the gaming device provides a predetermined award associated with a winning symbol combination including wild symbols in the game.

It should be appreciated that although the present application primarily discusses a trigger symbol, a combination of symbols (i.e., a trigger symbol combination) could be employed to trigger the award mode. It should also be appreciated that the trigger symbol could function as a wild symbol and one of the other reels could be re-activated.

In an alternative embodiment of the present invention, the probability-enhancing symbol includes a wild symbol which re-initiates or extends a bonus game. When a wild symbol occurs on at least one of a plurality of reels or designated reels, the gaming device locks, fixes, or holds stationary the position of the reel displaying the wild symbol and re-activates only the designated reels. The gaming device proceeds to hold stationary any designated reel displaying a wild symbol. As each reel displaying a wild symbol is held, the probability of obtaining a wild symbol on all of the designated reels is enhanced.

In one embodiment, the gaming device includes a plurality of reels, each having a plurality of symbols. The reels may be mechanical or video reels and include several symbols. In one embodiment, in addition to at least two wild symbols on separate or different reels, the symbols include a plurality of award symbols and at least one non-award symbol or null symbol or blank. The symbols may be any suitable symbols such as letters, numbers, characters or any other suitable images.

One or more paylines are included in the display to indicate symbols or symbol combinations on the reels which are evaluated for winning symbol combinations. It should be appreciated that any suitable number of paylines may be employed in the game.

A plurality of awards are associated with the award symbols or combination of award symbols according to a payable. If an award symbol or combination of award symbols has an associated award and is indicated on an activated payline, the gaming device provides the associated award or awards in each spin of the reels. In one embodiment, no award is associated with a null symbol.

In one embodiment, the game play includes providing one or more free spins of the reels to the player. A "spins remaining" display indicates the number of spins remaining in a game. The number of free spins may be randomly determined, predetermined, determined by a wager made by a player, or determined according to any suitable method. In each spin, the gaming device determines the award, if any, associated with any indicated award symbols on the reels as discussed above.

The gaming device, in one embodiment, provides the player with a total award in each of the spins where the total award is based on the award and/or modifiers associated with the award symbols indicated in each spin. The total award in each of the spins is added to the player's total award indicated in the total award display. The gaming device or the player continues to spin the reels until there are no spins remaining. The gaming device then provides the player with the total award indicated in the total award display at the end of the game.

In one embodiment, upon a triggering event in a base game or bonus game, the player enters a game-extending or bonus game-extending or re-initiation mode. In one embodiment, the re-initiation mode is triggered when a wild symbol is displayed on one of the designated reels or paylines. In one embodiment, the wild symbol occurs when the wild symbol is indicated on a designated reel on one of the paylines associated with the reels. In another embodiment, the wild symbols occurs on the reels when the wild symbol is indicated on any of the paylines. In a further embodiment, the wild symbol occurs on a designated reel if the wild symbol is generated at any displayed position on the reel. Thereafter, in one embodiment of the re-initiation mode, certain designated reels undergo a predetermined number of activations to determine if the player will continue in the base or bonus game.

In the re-initiation mode, the gaming device holds stationary or fixes the position of the reel(s) which include wild symbols. The gaming device concurrently, either simultaneously or sequentially, activates or spins the other designated reels a predetermined or accumulated number of free spins or until a wild symbol is displayed on the reels or indicated on a payline. Alternatively, the gaming device re-activates or re-spins any of the reels not displaying a wild symbol including, non-designated reels. If wild symbols are generated and displayed on each of the designated reels or paylines within the predetermined number of spins, the gaming device re-initiates the bonus game. In another embodiment, if the player has spins remaining in the re-initiation mode, the gaming device continues to re-activate the non-designated reels in the re-initiation mode to potentially increase the total award.

In one embodiment, the game reduces the number of reels on which a wild symbol must be displayed by locking or holding stationary the reel or reels that display a wild symbol as described above. Reducing the number of reels on which wild symbols must appear in order for the bonus game to be extended increases the probability that any one of the wild symbols will be indicated on the payline or reel. In one embodiment, in which fewer than the total number of reels are designated to display wild symbols to re-initiate the bonus game, the gaming device effectively reduces the game to a double or single-reel game or event. The reduction of the number of reels on which a wild symbol must be displayed increases the probability or chance that a combination of reels displaying wild symbols will occur to re-initiate the bonus game and obtain a larger award.

The probability is determined by multiplying the probability of the wild symbol being indicated on each of the reels or on the same payline of each of the reels in the bonus game. As discussed above, in a three-reel slot game, if each of the reels in the game includes twenty symbols, including one wild symbol, the probability or chance of obtaining a combination of wild symbols on the same paylines of all three reels is $(1/20)\times(1/20)\times(1/20)$ or 1 in 8000 or 0.0125%. The probability of indicating wild symbols on the same payline for two reels is for two reels is $(1/20)\times(1/20)$, which equals a probability of 1 in 400 or 0.25%, and, for one reel, 1 in 20 or 5%. Thus, it is significantly more likely that the player will obtain the combination of wild symbols required to extend the bonus game when the reels are locked upon displaying a wild symbol. This increases the player's excitement and enjoyment of the game because the player has a greater opportunity or probability of obtaining the relatively large award or jackpot award in subsequent play of the bonus game.

In one embodiment, a probability of being indicated on the payline is associated with each of the symbols on the reels. In one aspect of this embodiment, the probability associated with the wild symbols is less than the probability associated with at least one of the award symbols, and null symbols on the reels. In another aspect of this embodiment, the probability associated with the wild symbol is less than a plurality of the probabilities associated with the award symbols and null symbols. In a further aspect of this embodiment, the probability associated with the wild symbol is less than all of the probabilities associated with the award symbols and null symbols.

Similarly, in another embodiment, the award symbols include one relatively large award and several relatively small awards and have a probability of being indicated on the payline associated with the award symbols as discussed above.

In another embodiment, during the re-initiation mode, the gaming device provides a predetermined award associated with a winning symbol combination including wild symbols in the game. The wild symbol in this embodiment represents any symbol necessary to create a winning combination. For example, if a combination of three like symbols adjacent to one another on a payline generate an award, then two like symbols adjacent to a wild symbol will provide a winning combination to the player.

In a further embodiment, the re-initiation mode of the present invention includes an award associated with a winning symbol combination including a wild symbol or a combination including all wild symbols. In this embodiment, if the re-initiation mode is triggered and the wild symbols are indicated on the same payline, the gaming device provides the maximum or largest award in the game, such as the jackpot award.

Upon re-initiation of the bonus game, the gaming device resumes providing the player the award associated with any winning symbol or symbol combination indicated on the reels. It should be appreciated that the player may again be transferred to an award mode as discussed above. Any award provided to the player is added to the player's total award in a total award display, and the bonus mode continues until another wild symbol is generated on a designated reel or payline.

It should be appreciated that the present invention can be achieved with other suitable symbols besides the wild symbol.

Although the present invention is described with respect to a free spins game or a bonus game in certain embodiments, it should be appreciated that the present invention may be employed as a primary game, or bonus game or any other suitable type of game in a wagering gaming device. Additionally, although the present invention is described with respect to a reel type game, it should be appreciated that the present invention may be employed in any suitable non-reel type games such as a video poker game.

It should thus be appreciated that in one embodiment, the present invention provides a gaming device including a primary game operable upon a wager by a player, and a triggering event associated with the primary game. After the triggering event occurs, a generation of one or more symbols occurs without an additional wager by the player. The player is provided any award associated with any of the generated symbols from the generation. This generation and award process is repeated until a designated symbol or symbol combination occurs. In one embodiment, there is a limit to the number of generations. Other embodiments do not include a pre-set limit. After the designated symbol or symbol combination occurs, a subsequent event occurs. The result of the subsequent event is either a non-terminating result or a terminating result. In one embodiment, the terminating result (such as the failure to generate a designated number of symbols such as designated or wild symbols) and the non-terminating result (such as the generation of a designated number of designated or wild symbols). If the non-terminating result occurs, the generation and award process begins again. If the terminating result occurs, the generation and award process does not begin again and the game ends.

In one further embodiment, the gaming device includes a game operable upon a wager by a player, a plurality of reels in the game, a plurality of symbols on the reels, and a triggering event associated with the generation of one or more designated symbols on the reels. After the triggering event occurs, a generation of a plurality of the symbols occurs on the reels without an additional wager by the player. The player is provided any award associated with any winning combinations of generated symbols on the reels from the generation. The generation and award steps are repeated until a designated symbol or symbol combination occurs on the reels. If the designated symbol or symbol combination occurs, a subsequent event occurs, wherein the result of that event is either a terminating result or a non-terminating result are based on the number of designated symbols generated in said event. If the non-terminating result occurs, the generation and award process begins again. If the terminating result occurs, the generation and award process does not begin again.

In a further embodiment, the gaming device includes a game operable upon a wager by a player, a plurality of reels in the game, and a plurality of symbols on the reels which include at least two designated symbols. One of the designated symbols is on each of two different reels. A triggering event is associated with the generation of one or more designated symbols on the reels. After the triggering event, a generation of a plurality of the symbols on the reels occurs without an additional wager by the player. The player is provide any award associated with any winning combinations of generated symbols on the reels from the generation. This generation and award process continues until one of the designated symbols is generated on one of the reels in the generation. If one of the designated symbols is generated on one of the reels in the generation, the position of the reel with the designated symbol is locked for a designated number of further generations of symbols on a designated number of other reels. If a non-terminating event occurs such as a designated number of other designated symbols being generated on the reels in the designated number of further generations, the locked reel is unlocked and the above generation and award process begins. If a terminating result occurs such as designated number of other wild symbols are not generated on the reels in the designated number of further generations, no further generations of the reels occurs until another wager is made in the game. It should be appreciated that one embodiment includes providing the player any award associated with any winning combinations of generated symbols on the reels from each further generation. In one embodiment, if one of said designated symbols is generated on one of said reels in one of the further generations, that reel is locked, and the designated number of further generations of symbols occurs on a plurality of the reels without designated symbols. In one embodiment, each reel that generates one of the designated symbols is locked for the subsequent further generations of symbols until the designated number of other designated symbols are generated on the reels or the designated number of other designated symbols are not generated on the reels in the designated number of further generations.

It is therefore an advantage of the present invention to provide a gaming device that provides an increased probability of obtaining awards in a game.

Another advantage of the present invention is to provide a gaming device that increases the probability of obtaining a relatively large award in a game.

It is a further advantage of the present invention to provide a gaming device that increases the probability of obtaining the jackpot award in a game.

It is a further advantage of the present invention to provide a gaming device that increases the probability of extending the bonus game in a game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4A is probability table illustrating the probability of each of the symbols being indicated on each of the reels in a primary game.

FIG. 4B is probability table illustrating the probability of each of the symbols being indicated on each of the reels in an award mode.

DETAILED DESCRIPTION OF THE INVENTION

Gaming Device and Electronics

Figure 1A:
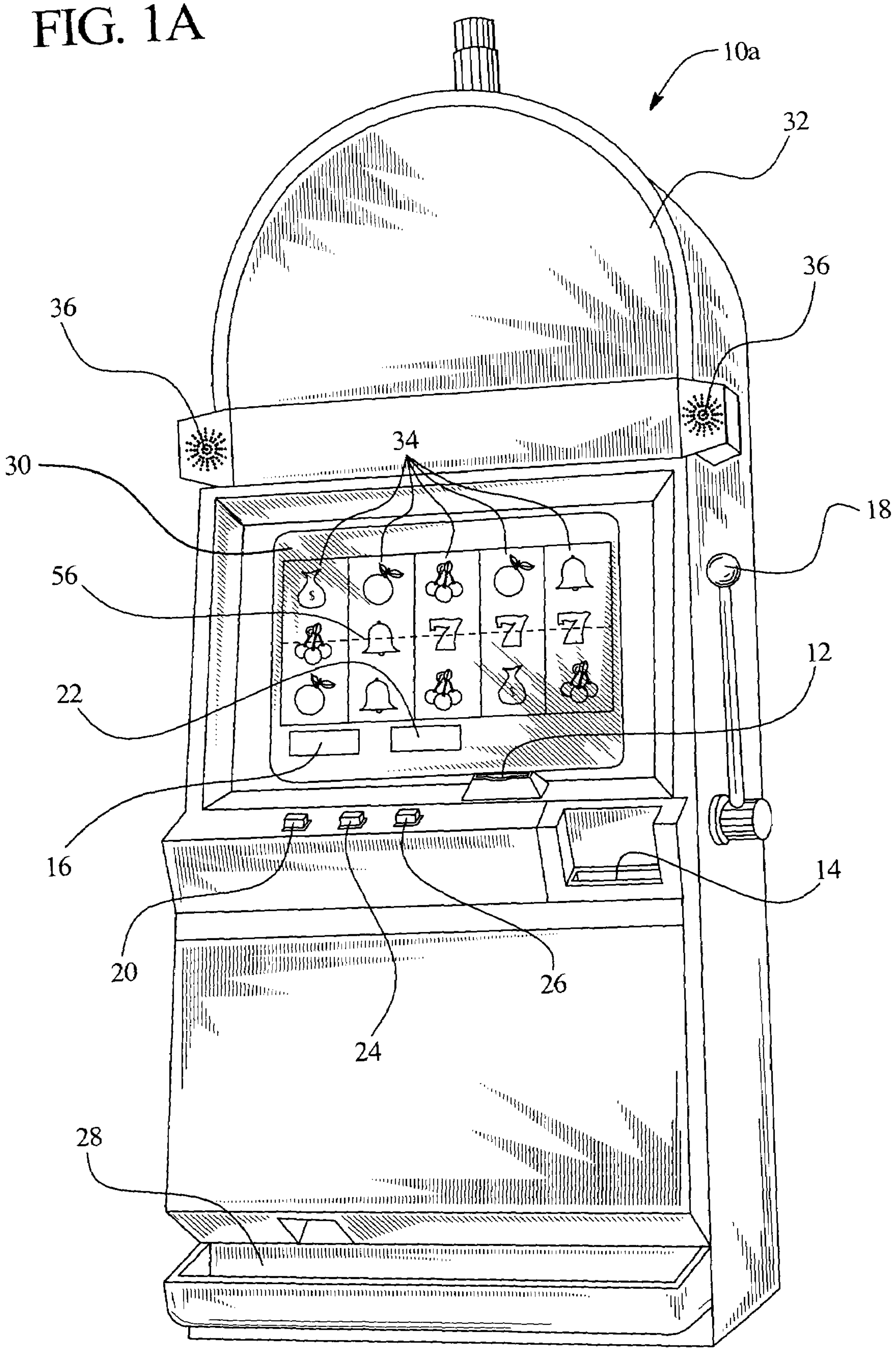
FIG. 1A is a front perspective view of one embodiment of the gaming device of the present invention.
Figure 1B:
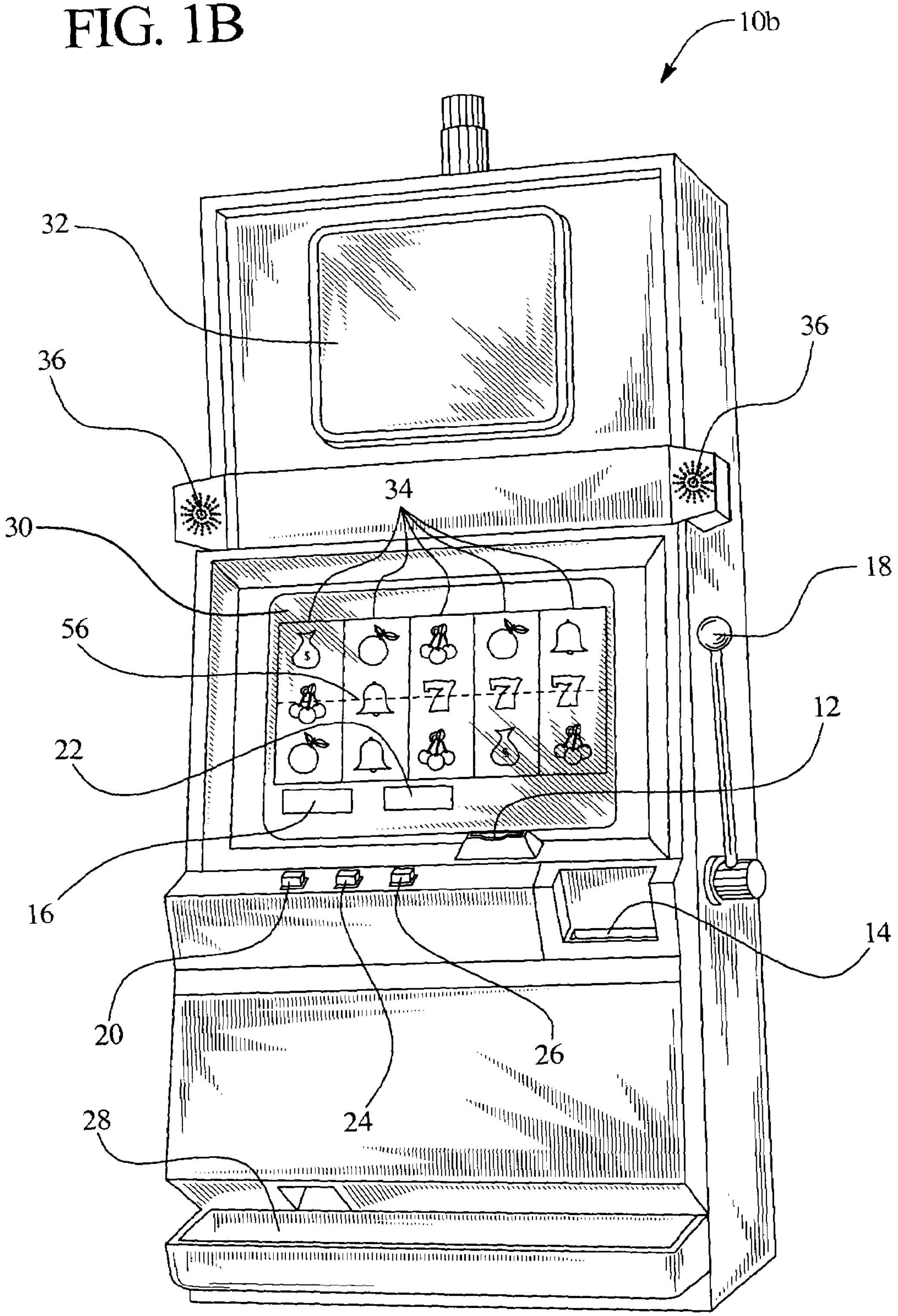
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device, which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
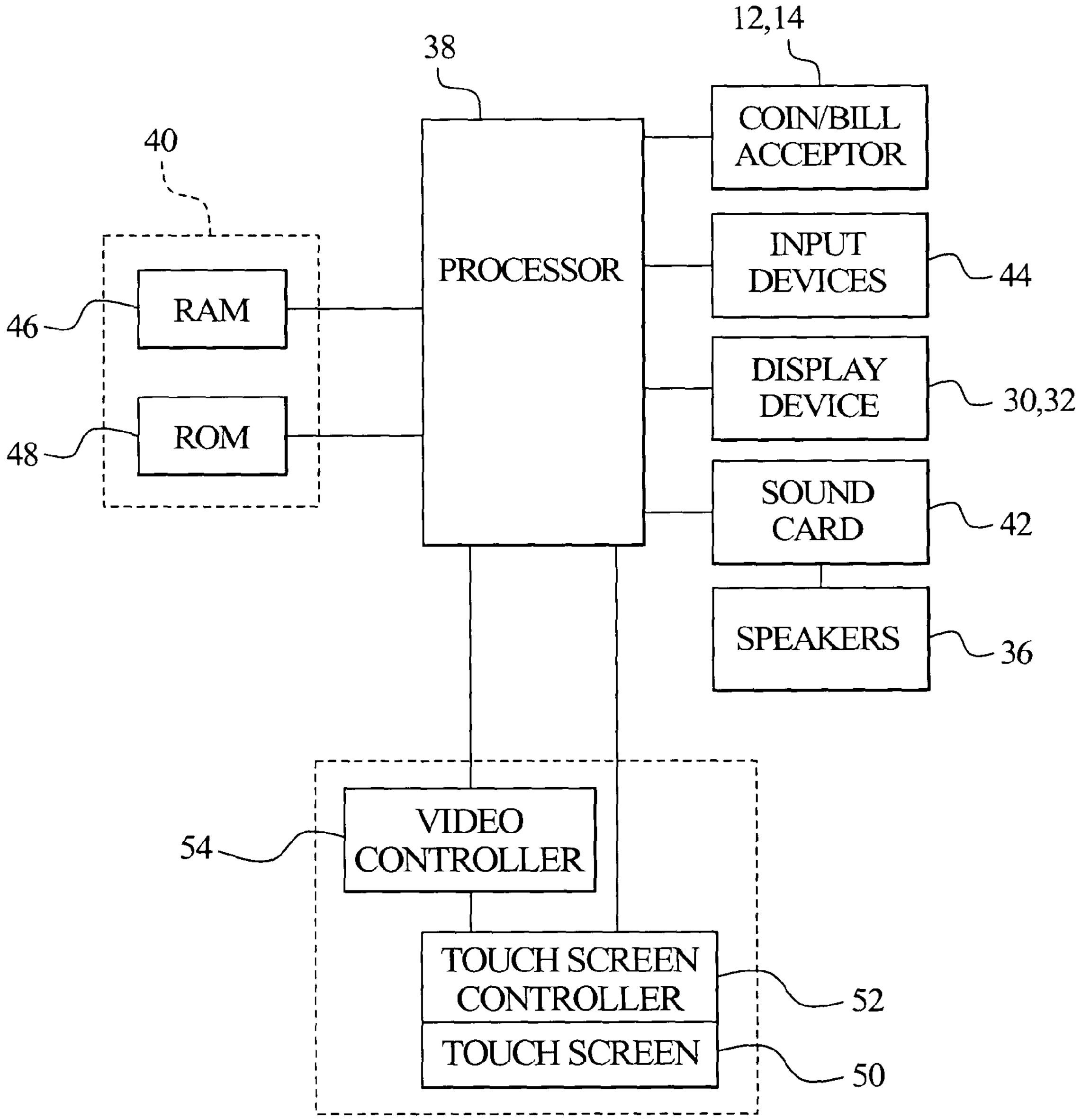
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a data network such as a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Probability Enhancing Trigger Symbol

Referring to FIGS. 1C, 3A, 3B, 4A and 4B, one embodiment of the reels of the present invention is illustrated where three reels are employed in a game. It should be appreciated that any suitable number of reels may be employed in the primary game. In this embodiment, each of the reels 34*a*, 34*b* and 34*c* includes symbols 100, which are represented by letters A, B, C, D, E, F, G and H, non-award or null symbols or blanks 104, at least one trigger symbol 102 and at least one wild symbol 105. It should be appreciated that any suitable number and types of symbols may be employed in a game according to the present invention. Each symbol is positioned at a reel stop position or reel stop on each of the reels. Therefore, one of the symbols such as one of the award symbols, one of the null symbols, the trigger symbol or the wild symbol will be indicated on a payline in the game.

Figures 3A, 3B:
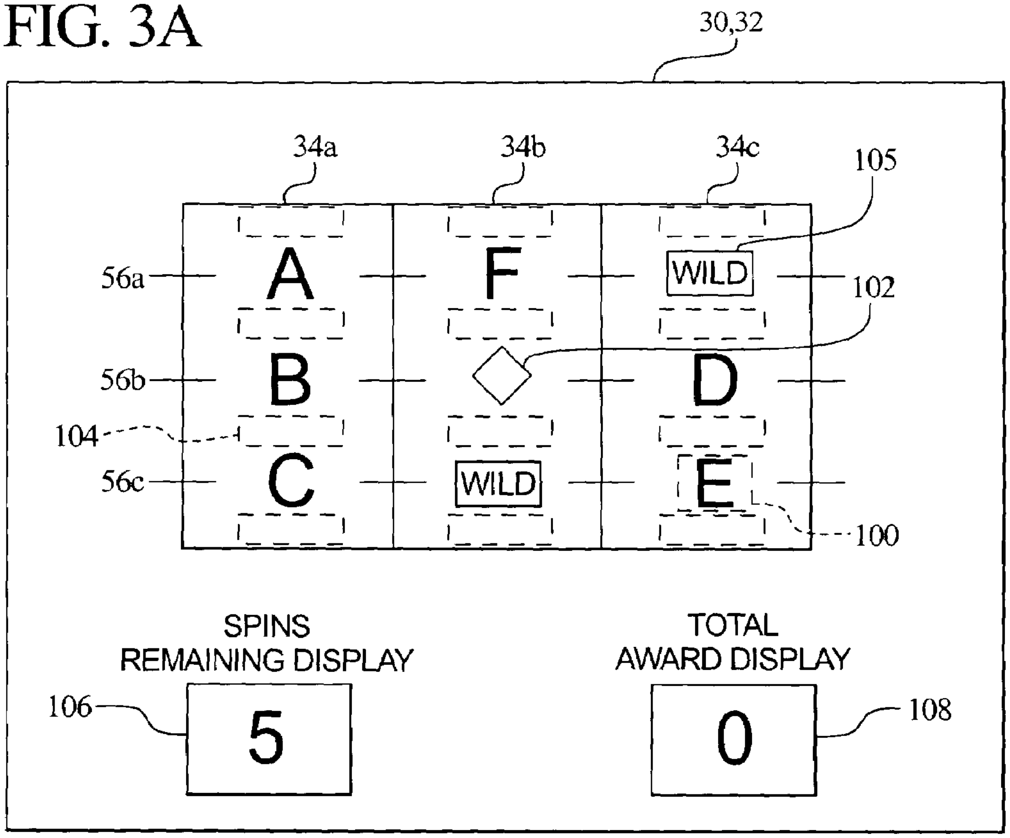
FIG. 3A is an enlarged elevation view of one of the display devices of FIGS. 1A and 1B illustrating one embodiment of the present invention.
FIG. 3B is an award table illustrating the symbol combinations and the awards associated with the symbols combinations of the embodiment of FIG. 3A.

Referring to FIG. 3A, in one embodiment the gaming device displays a plurality of reels and specifically three reels 34*a*, 34*b* and 34*c*. The reels include a plurality of symbols such as the letters A, B, C, D, E, F, G and H. The reels also include at least one trigger symbol, such as a diamond symbol 102. It should be appreciated that one or more of the reels may include at least on trigger symbol. Additionally, each of the reels includes at least one wild symbol 105 and at least one null symbol or blank 104. A probability of being indicated is associated with each of the symbols on the reels. In the primary game, the probability of each of the symbols being indicated on one of the reels is one in twenty (1/20) or 5.0% as shown in the probability table illustrated in FIG. 4A. If a triggering event occurs in the primary game, an award mode is initiated. In the award mode, the primary game is effectively reduced to a one-reel game. In addition, the null symbols 104 or blanks, and the trigger symbol, each re-spin or re-activate the reels. Thus, the effective number of symbols on the reels is reduced from twenty symbols to nine symbols, which further increases the probability that one of the symbols will be indicated on the reels. Several paylines, such as paylines 56*a*, 56*b* and 56*c* are associated with the reels. It should be appreciated that one or more paylines may be associated with the reels. A spins remaining display 106 indicates the number of spins remaining in the game. A total award display indicates the total value of the awards accumulated by the player in the game.

The gaming device provides the player with a number of spins in the game. The number of spins may be randomly determined, predetermined or determined in any suitable manner. The player uses the spins to activate or spin the reels 34*a*, 34*b* and 34*c*. The gaming device provides an award associated with one or more winning symbol combinations indicated on one of the paylines 56*a*, 56*b* or 56*c* associated with the reels. The player continues to spin the reels until the player has no spins remaining as indicated by the spins remaining display 106.

The trigger symbol or diamond symbol 102 increases the probability that the player will obtain one of the awards in the game and specifically increases the probability that the player will obtain the largest award such as the jackpot award in the game. The game preferably includes only one trigger symbol, designated as a diamond symbol 102, on one of the reels 34 in the game. In one embodiment, the middle reel 34*b*, includes the trigger symbol or diamond symbol 102. If the diamond symbol 102 is indicated on one of the paylines 56*a*, 56*b* or 56*c*, the gaming device initiates an award mode. In the award mode, the gaming device freezes or holds the reel 34*b* including the trigger symbol 102 stationary while the gaming device activates or spins the remaining reels or outside reels 34*a* and 34*c*, which are adjacent to the middle reel 34*b*. The gaming device activates or spins these reels until a wild symbol 105 is indicated on the same payline as the trigger symbol or diamond symbol 102.

Once the wild symbols 105 are indicated on reels 34*a* and 34*c* and on the same payline as the trigger symbol 102, the gaming device holds or keeps these reels stationary. The symbols on payline 56*b* are wild symbol 105*a* on reel 34*a*, trigger symbol or diamond symbol 102 on reel 34*b* and wild symbol 105*b* on reel 34*c*. The gaming device now re-spins or re-activates reel 34*b* until an award symbol such as one of the letters is indicated on payline 56*b*. Any award symbol 100 indicated on that payline will provide a symbol combination having three identical symbols matching the award symbol 100 indicated on that payline. This occurs because two of the symbols on that payline are the wild symbols 105*a* and 105*b* as illustrated in FIG. 5C. Because only the middle reel 34*b* is re-activated or re-spun during the game to determine the award, the game is reduced to a one reel or single reel game. The player now only needs to obtain one award symbol to win an award in the award mode. More specifically, the player only has to spin one reel 34*b* to obtain the largest award such as the jackpot award in the game. Thus, because the award mode reduced the game to a one reel or single reel game, the probability of obtaining any of the awards, and specifically the largest award in the game, increases significantly.

In the award mode, when the middle reel 34*b* is re-activated and the trigger symbol or diamond symbol 102 is indicated on payline 56*b*, the gaming device re-spins or re-activates reel 34*b*. Thus in one embodiment, the trigger symbol or diamond symbol does not provide an award to the player in the game. In another embodiment, an award is associated with the trigger symbol and is provided to the player if the trigger symbol is indicated on the reel after the reel is re-activated in the award mode.

Similarly, if a non-award or null symbol (i.e., blank) 104 is indicated on payline 56*b* on reel 34*b*, the gaming device re-spins or re-activates reel 34*b*. Thus, a null symbol does not provide an award to the player; rather, the reels are re-spun to give the player another opportunity to obtain one of the awards in the game. Once an award symbol 100 is indicated on the designated payline on reel 34*b*, the gaming device provides an award associated with the award combination including those symbols. If the award symbol happens to be the jackpot symbol, the player obtains three of the jackpot symbols and therefore, the jackpot award in the game. The award received by the player in the game is transferred to the total award display 108 and provided to the player when the game ends. In one embodiment, the game ends when the player obtains an award in the game. In another embodiment, the game ends when the player runs out of spins as indicated by the spins remaining display 106.

In a further embodiment, the gaming device includes a modifier such as a multiplier which changes such as by increasing when the null symbol occurs on the reel. The modifier such as the multiplier is employed in one embodiment to increase the award determined by the generated symbol on the reel.

By effectively reducing the game to a single reel or one reel game, the present invention significantly increases the probability of obtaining an award in the game without changing the random probability of occurrence. In particular, the present invention increases the probability or the likelihood that the player will obtain the largest award such as the jackpot award in the game. For example, in a typical reel-type game, a player must obtain one of a plurality of designated symbol combinations on one or more of the paylines associated with a set of reels to obtain an award in the game. The gaming device or player spins the reels and the reels randomly indicate symbols on one or more of the paylines associated with the reels. If a winning symbol combination is indicated on one of the designated winning paylines in the game, the gaming device provides an award associated with that winning symbol combination. The probability of obtaining a particular symbol combination, however, is based on the number of reels in a game and the number of symbols included on those reels. Thus, the more reels and symbols in a game, the less likely or less probable it is that the player will obtain one of the winning symbol combinations in that game.

For example, a particular game of the gaming device may include three reels, such as reels 34*a*, 34*b* and 34*c* in FIG. 3A. In this example, each of the reels includes twenty reel positions, which include nine award symbols as symbols A, B, C, D, E, F, G, and H, one wild symbol, one trigger symbol and ten null symbols. In this example, the symbols must occur or be indicated on payline 56*b* to provide a winning symbol combination in the game. Thus, at the beginning of the game each symbol has a 5% (1/20) chance or probability of being indicated on payline 56*b* on each of the reels as illustrated in FIG. 4A. As a result, the overall probability that a particular symbol combination will occur on that payline is (1/20)×(1/20)×(1/20), which equals (1/8000) or 0.013%. Therefore, in this example, because each symbol has a 5% (1/20) chance or probability of being indicated on a single payline on the reels, the overall probability of a particular symbol combination occurring on that payline in the primary game (without the award mode) is (1/8000) or 0.013%.

Referring to FIG. 3B, an example of a payout or award table is illustrated. In this example, a winning symbol combination in the primary game includes three identical symbols. For instance, the jackpot award or largest award indicated on the table is the award of ten thousand associated with the symbol combination including three A symbols (i.e., A, A, A). The award associated with the other winning symbol combinations are also shown in the table. It should be appreciated that any suitable combination of symbols in a game may be designated as a winning symbol combination.

Referring to FIG. 4A, a probability table for a primary game or base game indicates the probability of each of the symbols being indicated on a payline for each reel in the three reel slot game shown in FIG. 3A. The table also indicates the probability of being indicated on a payline associated with each of the winning symbol combinations shown in FIG. 3B for each of the symbols on the reels and the probability of three null symbols or blanks being indicated on the payline. As illustrated in the table, the probability of each of the award symbols (i.e., A, B, C, D, E, F, G and H) being indicated on any one of the reels is (1/20). The probability of a winning symbol combination including one of the award symbols, the trigger symbol or the wild symbol, being indicated on the designated payline is (1/8000) (i.e., (1/20)×(1/20)×(1/20)). The probability of three null symbols or blanks being indicated on the payline is ((10/20)×(10/20)×(10/20)) or (1/8). Therefore, a player has a one in eight thousand chance in the primary game to obtain one of the winning symbol combinations, and specifically of obtaining the jackpot award in the game.

In the award mode of the present invention, the number of reels is effectively reduced to one reel or one active reel such as reel 34*b*. As a result, the probability of obtaining a particular symbol or a particular symbol combination increases significantly. Referring to FIG. 4B, a probability table illustrates the probabilities of each of the symbols being indicated on the reel in the award mode. Additionally, the table illustrates the probability of a winning symbol combination, which in the award mode is one award symbol, being indicated on the payline in the award mode. Because the trigger symbol and the null symbols cause the reel to re-spin in the award mode, the number of effective award symbols in the award mode is reduced to nine. Therefore, the probability of each of the award symbols or the wild symbol being indicated on the payline in the game (through the award mode) is (1/180), which is the probability of the trigger symbol being indicated on the payline in the primary game (1/20) multiplied by the probability of any one of the award symbols or the wild symbol being indicated on the payline in the award mode, which is (1/9). The probability of one of the award symbols or the wild symbol being indicated in the game (through the award mode) is therefore, (1/20)×(1/9) or (1/180) as shown in FIG. 4B. Accordingly, the overall probability of obtaining a specific symbol combination is (0.013% (1/8000)+0.56% (1/180) which equal 0.573%.

Referring to FIG. 3A, in one example of the award mode of the present invention, if a trigger symbol or diamond symbol 102 is indicated on payline 56*b* in a primary game, an award mode is initiated and the outside reels 34*a* and 34*c* are re-activated or re-spun until wild symbols are indicated on payline 56*b*. Then, the reels 34*a* and 34*c* are held stationary while the middle reel 34*b* is re-activated or re-spun until an award symbol is indicated on payline 56*b*. The probability or likelihood of obtaining a particular symbol combination on the reels has now increased because the player only has to obtain one award symbol on reel 34*b* in order to obtain an award in the game.

Figure 1C:
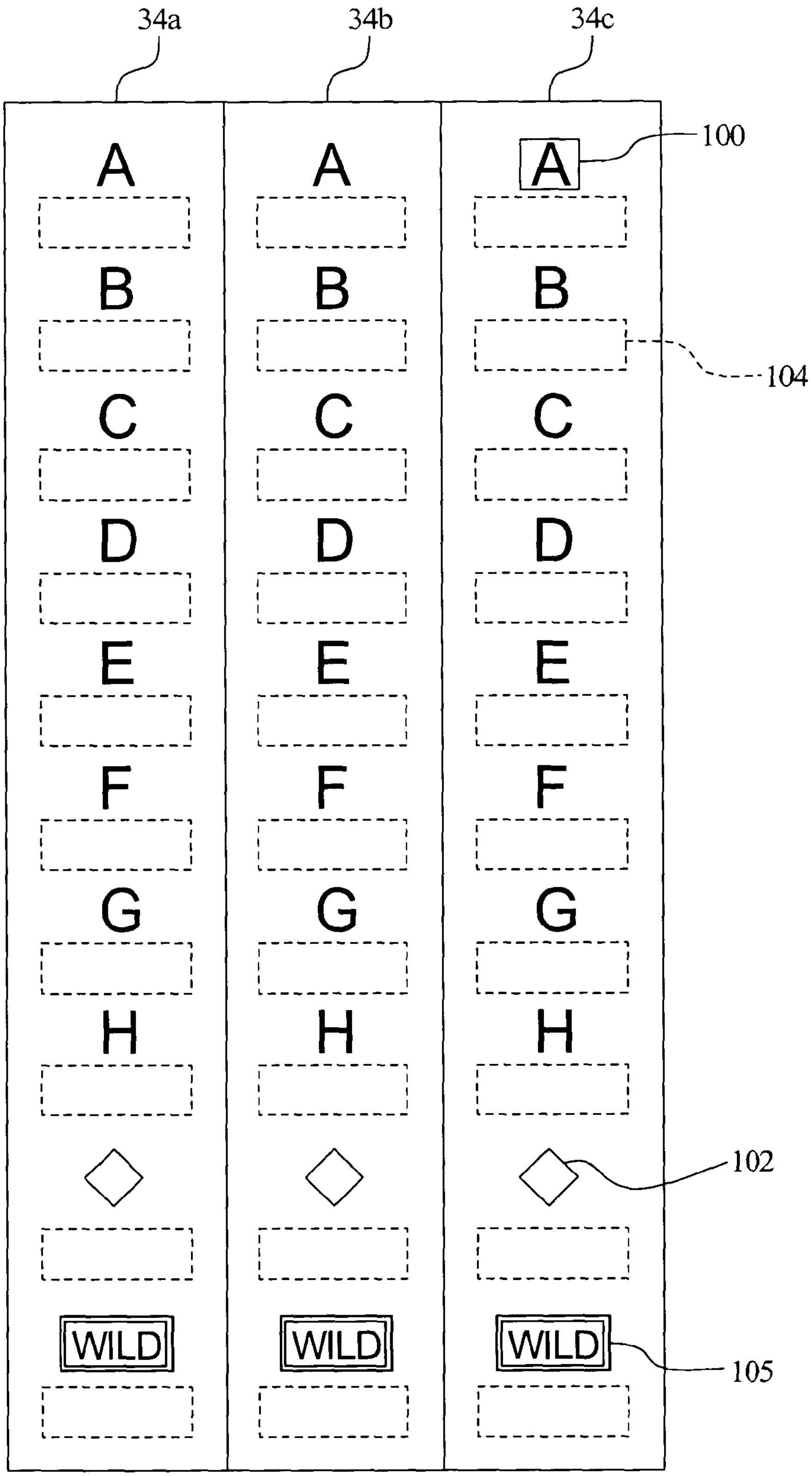
FIG. 1C is a enlarged elevation view of a set of reels and the reel stop positions included on the reels in a three reel slot game.

In this example, the middle reel 34*b* includes twenty reel positions including eight award symbols, one wild symbol, a trigger symbol or diamond symbol 102, and ten null symbols 104 as shown in FIGS. 1C and 3A. Therefore, the player initially has a one in twenty chance of obtaining the trigger symbol or diamond symbol 102 on reel 34*b* in the primary game as described above. In the award mode, if the player obtains the trigger symbol 102 or one of the null symbols 104 on payline 56*b* after the reel 34*b* is re-activated, the gaming device re-spins or re-activates reel 34*b* again until an award symbol 100 is indicated on payline 56*b*. Because the trigger symbol 102 and the null symbols 104 re-spin or re-activate the reels in the award mode, the actual number of symbols that provide an award and end the bonus mode are nine (i.e., the eight award symbols and the wild symbol). Therefore, the player has a one in nine chance of obtaining an award symbol 100 in the award mode and thereby a 11.1% chance of obtaining a winning symbol combination on payline 56*b*. As a result, the overall probability of obtaining a winning symbol combination on the reels in the award mode is determined by taking the probability of obtaining the trigger symbol or diamond symbol 102 on reel 34*b* in the initial or primary game, which is 1 in 20 (1/20), multiplied by the probability or the likelihood of one of the award symbols being indicated on payline 56*b*, which is 1 in 9 (1/9). The overall probability therefore equals (1/180) or 0.56% for obtaining any one of the winning symbol combinations on the reels in the game (through the award mode) as shown in FIG. 4B. Thus, the probability of obtaining a winning symbol combination on the reels in the primary game is 1 in 8000 or 0.013% and this probability increases to 1 in 180 or 0.56% in the award mode. This significantly increases a player's opportunities or chances of obtaining one of the awards in the game and specifically a relatively large award such as the jackpot award. This increases a player's excitement and enjoyment of the game.

Figure 5A:
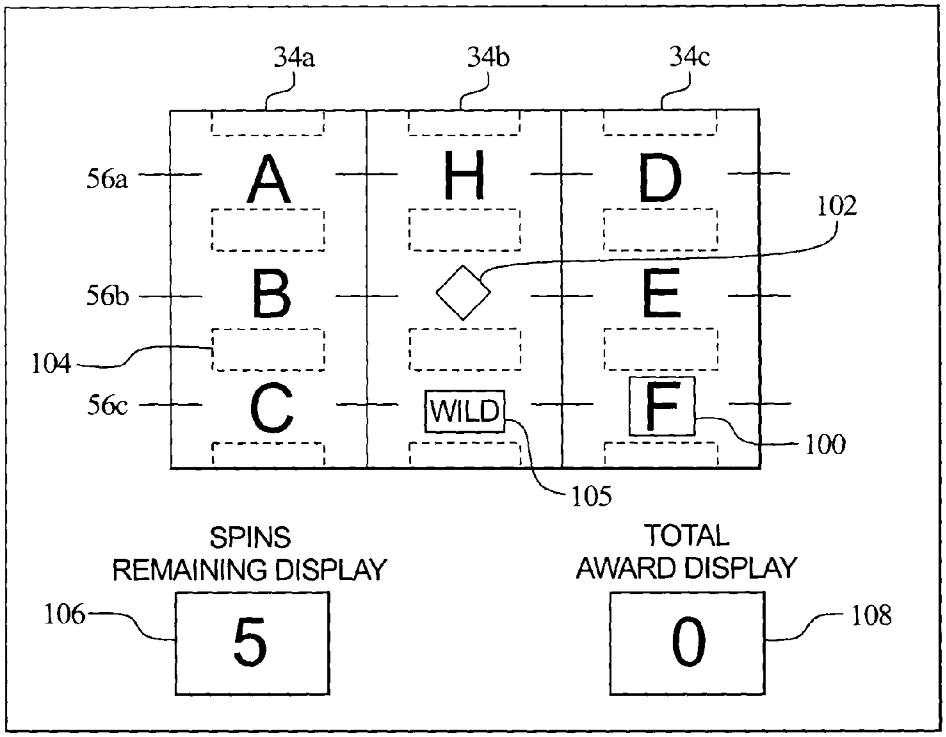
FIGS. 5A, 5B, 5C, 5D, 5E and 5F are enlarged front elevation views of an example of the embodiment shown in FIG. 3 illustrating a primary game and an award mode initiated by the occurrence of a triggering event in the primary game.
Figure 5B:
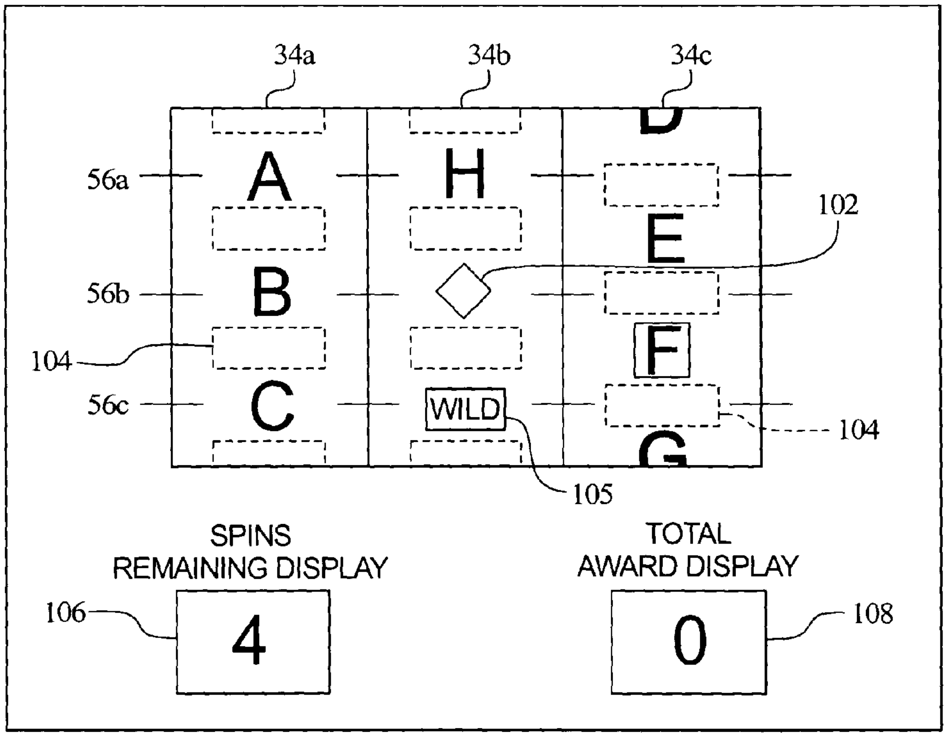
Figure 5C:
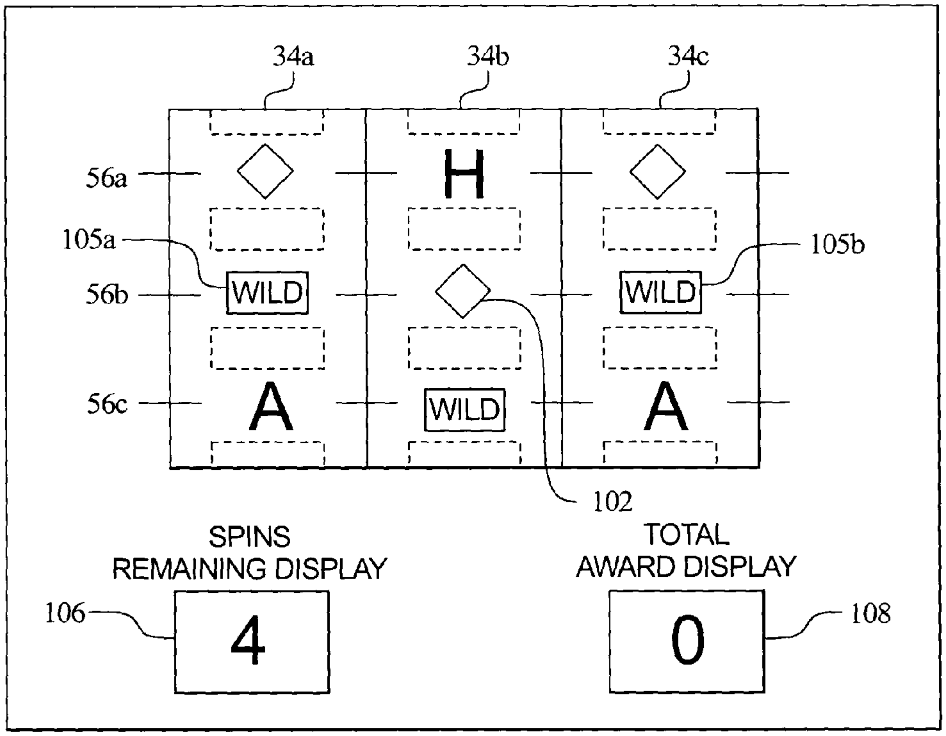

Referring to FIGS. 5A through 5F, an example of one embodiment of the present invention is illustrated where the player obtains a trigger symbol or diamond symbol 102 in the primary game or primary mode. This example includes three reels 34*a*, 34*b* and 34*c* as shown in FIG. 5A, where each reel includes a plurality of award symbols A, B, C, D, E, F, G and H, one trigger symbol designated as diamond symbol 102, one wild symbol 105 and ten null symbols 104. The player begins the game with five spins as indicated by the spins remaining display 106 as shown in FIG. 5A. Additionally, the player begins the game with an award of zero as indicated by the total award display 108. The player uses their first spin as shown in FIG. 5B to activate or spin the reels. A trigger symbol or diamond symbol 102 is indicated on payline 56*b* on reel 34*b*. The trigger symbol or diamond symbol 102 initiates the bonus mode of the present invention.

Referring to FIG. 5C, the gaming device freezes or holds reel 34*b* stationary while spinning or re-spinning the outside reels 34*a* and 34*c* until wild symbols 105*a* and 105*b*, respectively, are indicated on payline 56*b* on those reels. As indicated by the spins remaining display 106, the number of spins does not decrease when these reels are activated or re-activated to indicate the wild symbols. Additionally, the total award display 108 indicates that the player does not obtain an award for obtaining the trigger symbol (i.e., diamond symbol 102) or the wild symbols 105*a* or 105*b*. In another embodiment, the gaming device provides an award associated with the trigger symbol and/or the wild symbols.

Figure 5D:
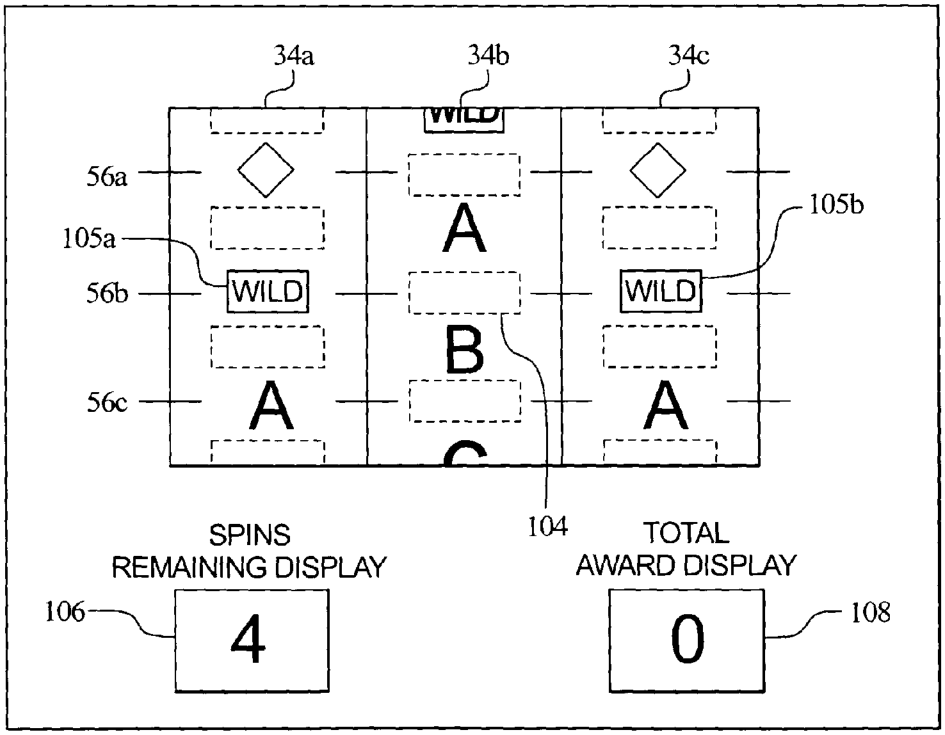

Referring to FIG. 5D, the outside reels 34*a* and 34*c* are stationary or cannot be re-activated, therefore the gaming device or player can only re-activate or re-spin reel 34*b*. In FIG. 5D the gaming device re-activates reel 34*b* and a null symbol 104 is indicated on payline 56*b*. The symbol combination of a wild symbol 105*a*, a null symbol 104 and wild symbol 105*b* on reels 34*a*, 34*b* and 34*c*, respectively, is not a winning symbol combination in the game. Therefore, the player does not receive an award for this symbol combination. However, the null symbol 104 does not end the game, but instead causes the gaming device to automatically re-spin or re-activate reel 34*b*. Thus, the null symbol 104 provides the player with another opportunity to obtain an award symbol in the game. The number of spins remaining in the award mode does not decrease as indicated by the spins remaining display 106 and the total award still remains at zero as indicated by the total award display 108.

Alternatively, as indicated above, the game upon the occurrence of the null symbol can change such as increment a modifier (such as a multiplier) which is employed to modify and preferably increase the award to the player.

Figure 5E:
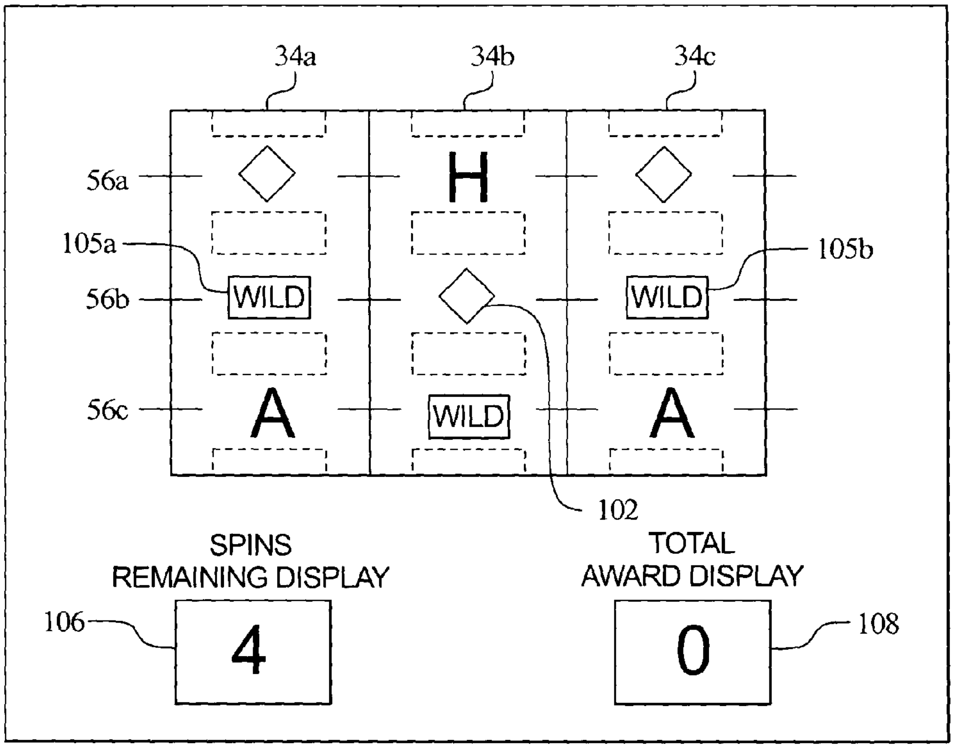

Referring to FIG. 5E, the gaming device or player re-activates reel 34*b* in the game. The trigger symbol or diamond symbol 102 is indicated on payline 56*b* on reel 34*b*. The resultant symbol combination is the wild symbol 105*a*, the trigger symbol 102 and the wild symbol 105*b*, on reels 34*a*, 34*b* and 34*c*, respectively, which is not a winning symbol combination. Similar to the null symbol 104 shown in FIG. 5D, the trigger symbol or diamond symbol 102 causes the gaming device to re-activate or re-spin reel 34*b*. Therefore, the player has another opportunity to obtain an award symbol in the game. The number of spins remaining in the bonus mode and the total award did not change in the game as indicated by the spins remaining display 106 and the total award display 108.

Figure 5F:
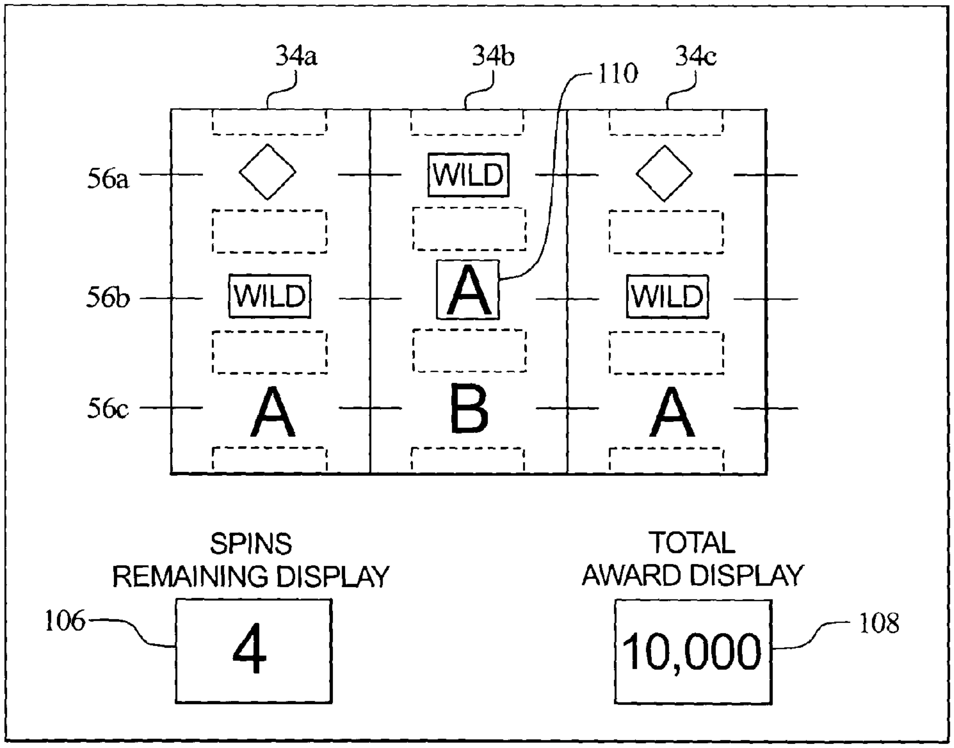

Referring to FIG. 5F, the gaming device or player re-spins and re-activates reel 34*b* in the award mode. After this spin, an award symbol designated by the letter A (110) is indicated on payline 56*b* on reel 34*b*. As a result, a winning symbol combination including wild symbol 105*a* on reel 34*a*, award symbol 110 on reel 34*b* and wild symbol 105*b* on reel 34*c* is indicated on payline 56*b*. This symbol combination provides a combination of three A symbols 110 because the wild symbols act or equal the award symbol 110. In this example, a combination including three A symbols provides the jackpot or largest award of ten thousand to the player as indicated by the total award display 108. Thus, the trigger symbol or diamond symbol 102 increases the probability or likelihood that the player will obtain an award and particularly the jackpot award in the game. The player has four spins remaining as indicated by the spins remaining display 106. In one embodiment, the player uses the remaining spins to spin the reels four more times in the award mode. In another embodiment, the game ends when the player obtains an award in the game.

Figure 6:
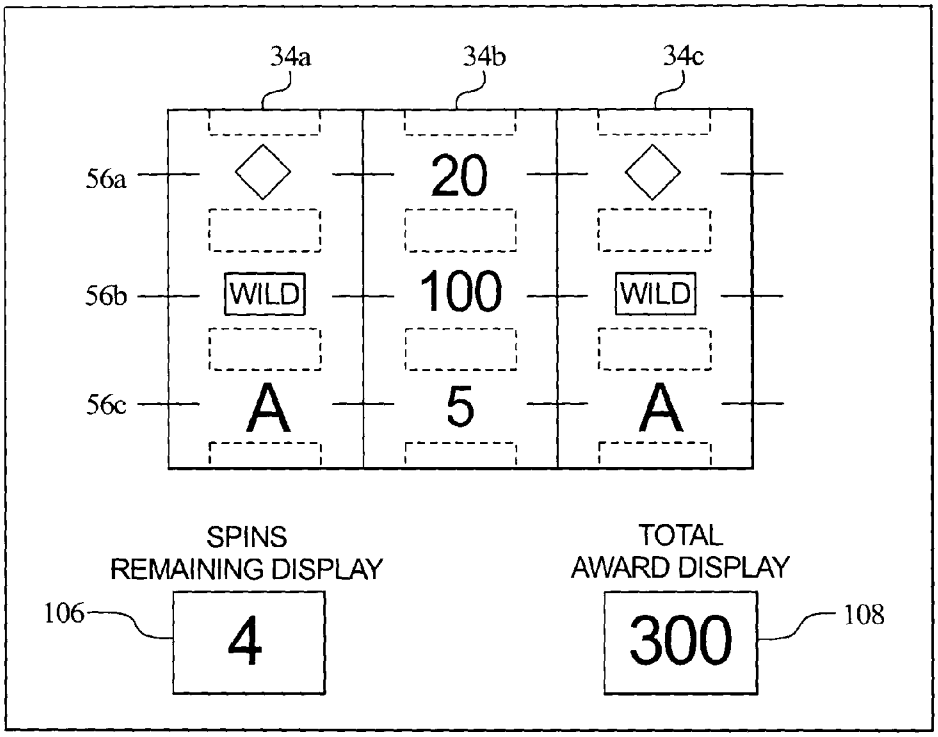
FIG. 6 is an enlarged elevation view of one of the display devices of FIGS. 1A and 1B illustrating another embodiment of the present invention.

Referring to FIG. 6, another embodiment of the present invention is illustrated where the symbols on the middle or central reel 34*b* include awards, such as the values of twenty, one hundred and five. In the award mode of this embodiment, the player re-spins or re-activates reel 34*b* until one of the award values are indicated on payline 56*b*. Instead of obtaining a winning symbol combination in the game, the player obtains three times the value of the indicated award or value on payline 56*b*. For example, in FIG. 6, the award of one hundred is indicated on payline 56*b* in the award mode. Therefore, the combination of the award of one hundred with the wild symbols 205*a* and 205*b* provide an award of three hundred because the wild symbols match the award value indicated on payline 56*b* on reel 34*b*. Thus, the player obtains an award of three hundred as indicated by the total award display 108 in the award mode. It should be appreciated that any symbols, values or any combination of symbols or values may be employed on the reels in the award mode of the game of the present invention.

Figure 7:
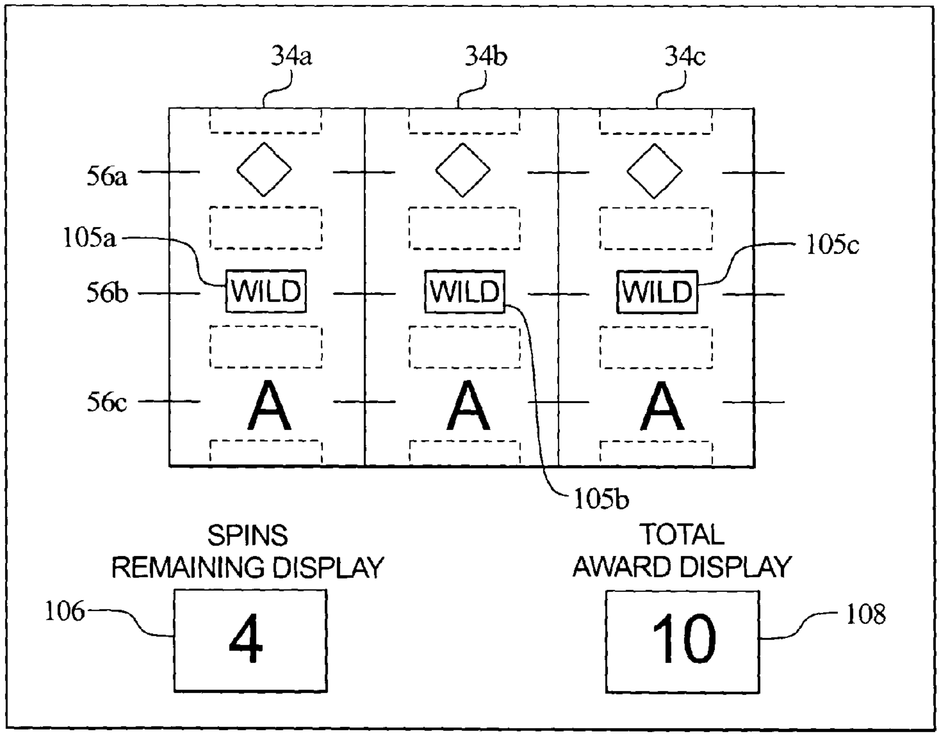
FIG. 7 is an enlarged elevation view of one of the display devices of FIGS. 1A and 1B illustrating a further embodiment of the present invention.

Referring to FIG. 7, a further embodiment of the present invention is illustrated where the middle or center reel 34*b* includes a wild symbol 105*b*. In this embodiment, the player re-spins reel 34*b* after obtaining the trigger symbol or diamond symbol 102 as described above. If the player obtains the wild symbol on payline 56*b* on reel 34*b*, the player obtains a symbol combination including three wild symbols 105*a*, 105*b* and 105*c*. Thus, the player obtains the largest award or the highest or most desirable symbol combination associated with the game such as the jackpot symbol combination because the player obtained three wild symbols on payline 56*b*. Thus, the wild symbol 105*b* increases the probability that the player will obtain the largest award such as the jackpot award in the game. In another embodiment, an award or award value is associated with the symbol combination including the wild symbol as shown in FIG. 3B.

In one alternative embodiment of the present invention, the number of spins of the reel can be limited such as to a predetermined number, a randomly determined number, or a number based on another functional game element such as the player's wager.

Probability-Enhancing Wild Symbol

Referring now to FIGS. 8, 9A to 9D, and 10A to 10D, in one alternative embodiment of the present invention, the probability-enhancing symbol is a wild symbol. In a preferred embodiment, when a designated number such as one or more wild symbols 101, 103, and 105 appear on or are displayed on at least one of five reels 34*a*, 34*b*, 34*c*, 34*d* and 34*e*, during a primary or secondary game, a bonus game re-initiation mode of the game is triggered. The reels may be mechanical reels or video reels as described above. It should be appreciated that any suitable number of reels may be employed in the base or bonus game. In this embodiment, each of the reels 34*a*, 34*b*, 34*c*, 34*d* and 34*e* includes award symbols 100*a* to 100*h*, which are represented by letters A 100*a*, B 100*b*, C 100*c*, D 100*d*, E 100*e*, F 100*f*, G 100*g* and H 100*h*, non-award or null symbols or blanks 104, and at least one wild symbol 101. It should also be appreciated that, although the award symbols are illustrated as letters, the award symbols may be any suitable symbols such as conventional symbols on slot machines, wherein individual symbols or specific combinations of symbols result in wins or award outcomes.

Figure 9A:
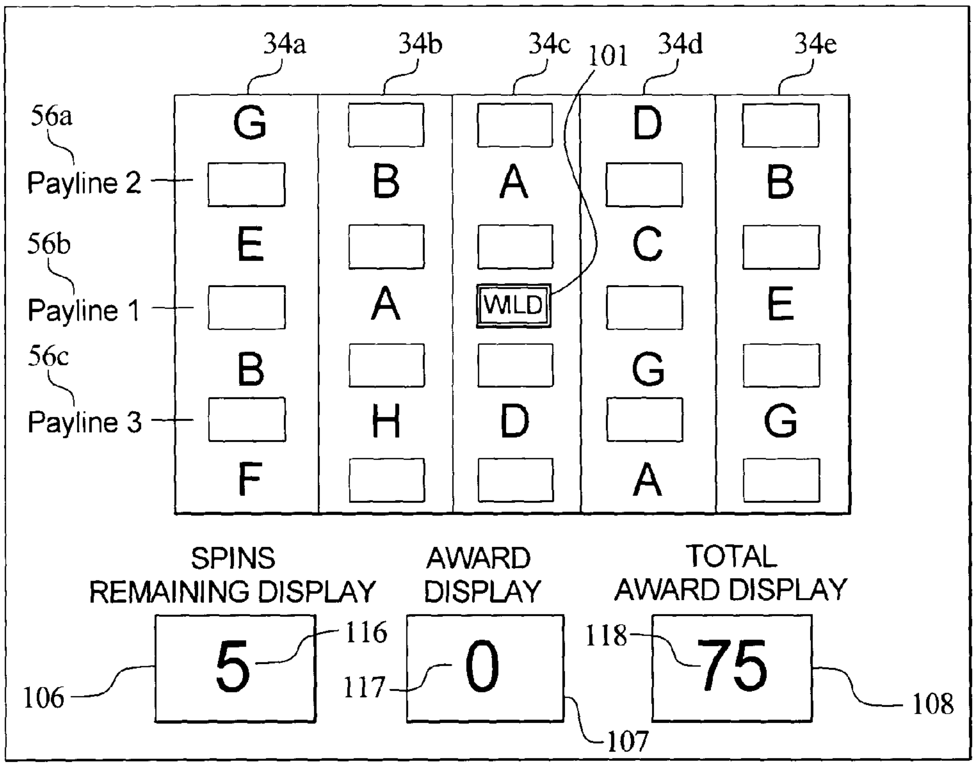
FIGS. 9A, 9B, 9C and 9D are enlarged front elevation views of one of the display devices of FIGS. 1A and 1B illustrating an example of one of the embodiments of the present invention where non-designated reels remain activated during a re-initiation mode.
Figure 9B:
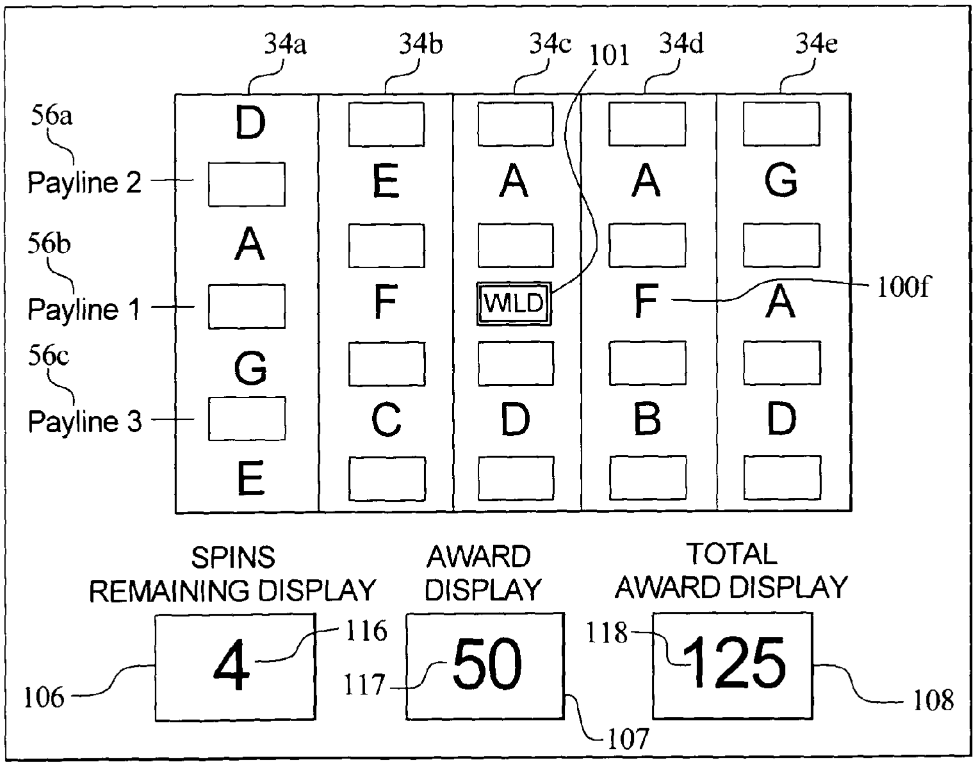
Figure 9C:
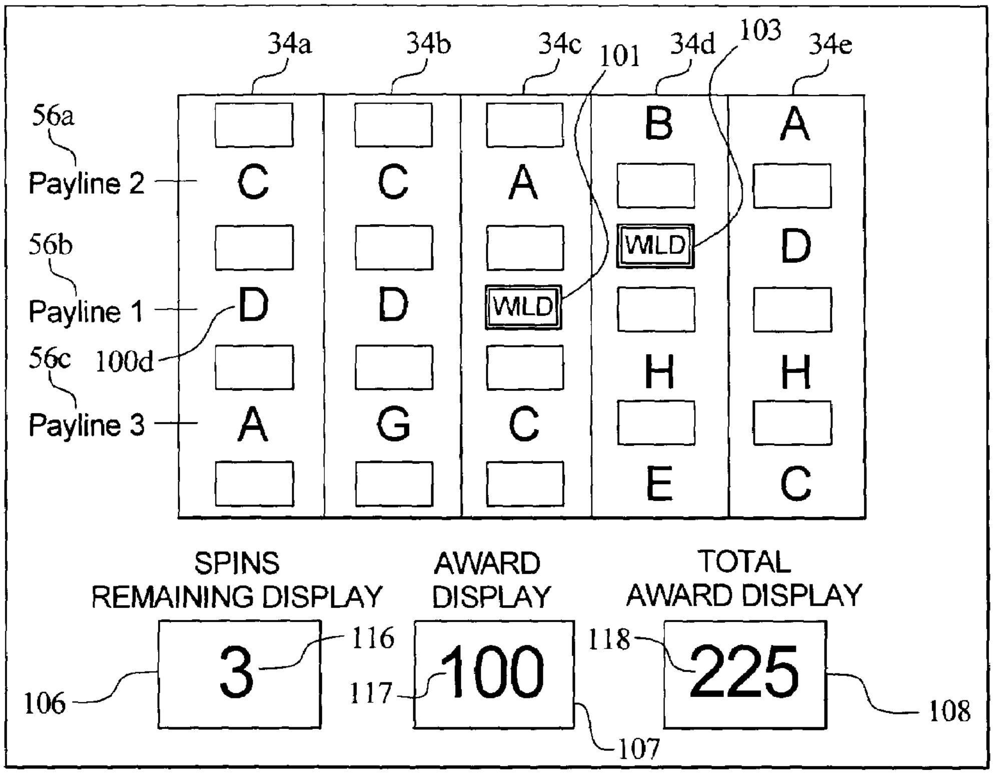
Figure 9D:
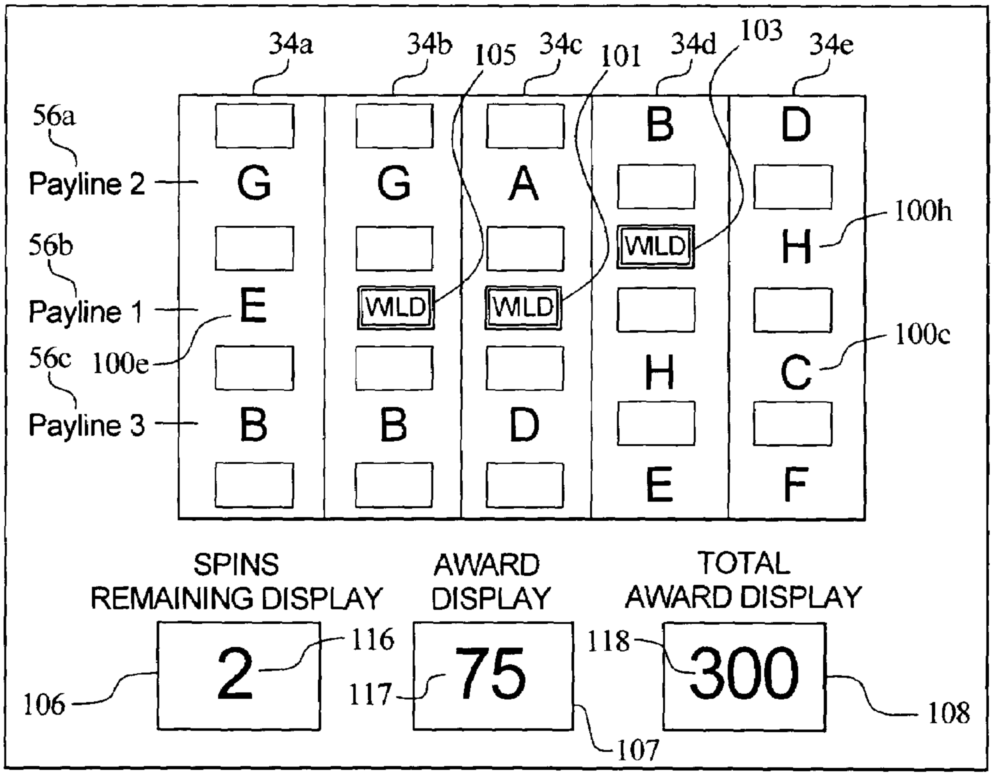

In one embodiment, the middle three reels 34*b*, 34*c*, and 34*d* are designated to be activated in the re-initiation mode of the secondary game and include at least one wild symbol 101, 103 and 105 on each designated reel 34*b*, 34*c* and 34*d*, respectively as best illustrated in FIG. 9D. It should be appreciated that one or more of the other, non-designated reels 34*a* and 34*e* may include at least one wild symbol and may be activated in the re-initiation mode. Each symbol is positioned at a reel stop position or reel stop on each of the reels. Therefore, one of the symbols, such as one of the award symbols 100, one of the null symbols 104, or the wild symbols 101, 103, and 105 will be indicated on at least one of the paylines in the game.

A plurality of awards are associated with the award symbols 100 or combinations of award symbols as illustrated in the example paytable in FIG. 3B. It should be appreciated that an alternative or different paytable may be used in the re-initiation mode. The awards may be values, credits, free spins, free games, modifiers such as multipliers, or any other suitable outcome or outcomes. In one embodiment, a null symbol does not provide an award to the player.

Figure 8:
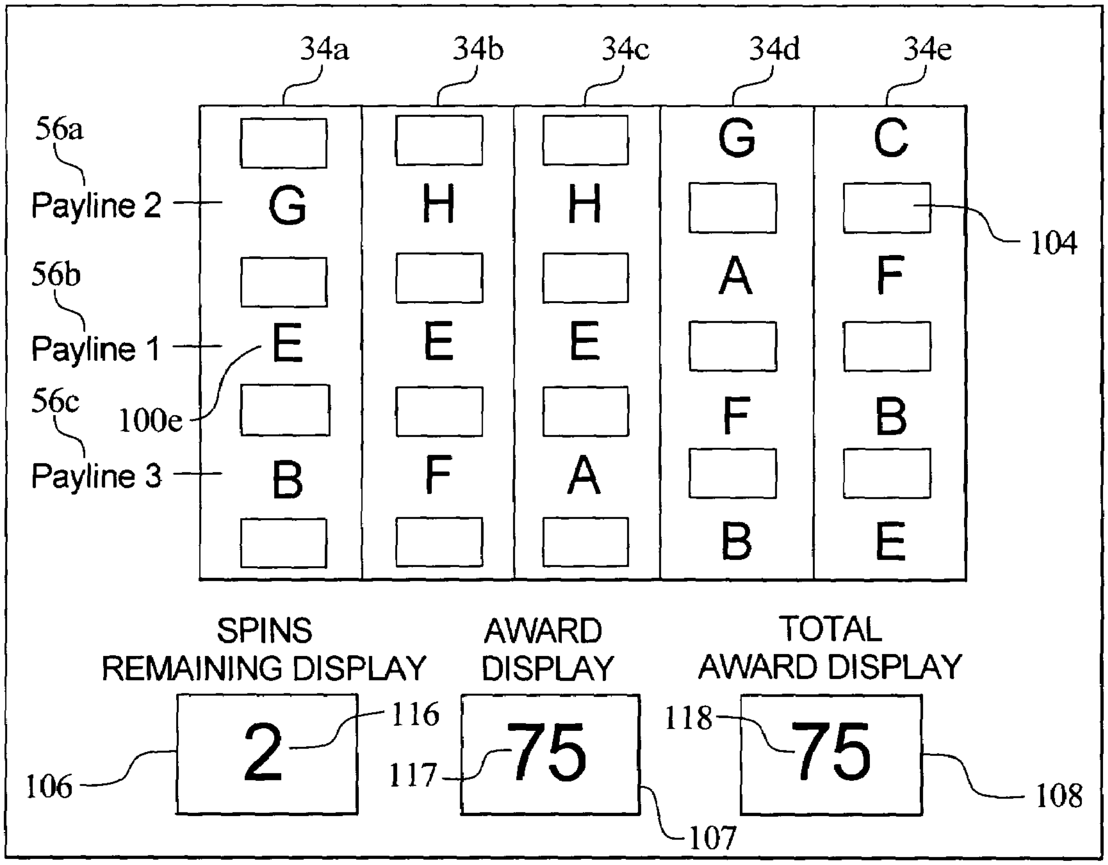
FIG. 8 is an enlarged front elevation view of one of the display devices of FIGS. 1A and 1B illustrating an example of one of the embodiments of the present invention before a re-initiation mode is initiated.

In an example of one embodiment of the present invention illustrated in FIG. 8, the gaming device provides the player with one or more free spins of the reels in a primary or bonus game after the player achieves a bonus-triggering or qualifying condition during the primary game. The triggering event may be a symbol or a combination of symbols occurring on the reels, or any other suitable event. The designated number of spins may be predetermined, randomly determined, based on an event in the base game, or determined using any other suitable method. In the free spins game, the gaming device or the player spins or activates the reels 34*a*, 34*b*, 34*c*, 34*d* and 34*e* for the determined or designated number of spins.

The gaming device continues to spin the reels and to provide the player with an award, if any, in each of the free spins of the reels until there are no free spins remaining in the game as indicated by the spins remaining display 106.

In one embodiment, the gaming device provides an award associated with at least one winning symbol combinations indicated on one of the paylines 56*a*, 56*b* or 56*c* associated with the reels. Alternatively, the gaming device provides the player any awards associated with the award symbols indicated on any activated payline 56*a*, 56*b* or 56*c*. In each of the activations, the gaming device illustrated in FIG. 8 indicates the award or awards 117 in an award display 107 associated with any award symbols and updates a total award display 108, which indicates the awards accumulated by the player in the game. It should be appreciated that the gaming device or player may choose to determine the total award 118 after each of the free spins or after a plurality of free spins in the game.

In the example illustrated in FIG. 8, the gaming device activates or spins the reels at the beginning of, or during a free spins bonus game. The reels stop, and a combination of three identical symbols appear adjacent to one another along payline 56*b*. According to the paytable in FIG. 3B, the player receives an award 117 of seventy-five associated with the combination of three E symbols on a payline 56*b*. The award 117 of seventy-five is displayed in the award display 107, and the total award display 108 is updated to give the player a total award 118 of seventy-five in the game. The player has only two spins 116 remaining in the game as indicated by the spins remaining display 106. The gaming device activates or spins the reels 34*a* to *e*.

Referring to FIG. 9A, the reels 34*a* to 34*e* stop spinning and indicate a wild symbol 101 on the middle reel 34*c*. In one embodiment, the presence of the wild symbol 103 on the display, initiates a re-initiation mode of the gaming device. It should be appreciated that more than one wild symbol may be displayed on the reels to begin a re-initiation mode. Alternatively, the wild symbol 101 must be indicated on one of the paylines 56*a*, 56*b* or 56*c* to initiate a re-initiation mode.

In the re-initiation mode, the gaming device activates or provides the player a predetermined or randomly determined number of free spins of the remaining non-fixed reels 34*a*, 34*b*, 34*d* and 34*e* while fixing, locking or holding stationary the reel 34*c* displaying the wild symbol 103. In this example, the player is provided a predetermined number of five free spins at the onset of the re-initiation mode, resetting the spins remaining display 106 to five instead of one. Alternatively, the number of free spins provided to the player in the re-initiation mode are added to the number of spins remaining in the secondary game or are based on another event in the game. In an alternative embodiment, an unlimited number of free spins are provided until a lock feature initiates and then the player must acquire a designated number of wild symbols to re-initiate the free spin mode. If such symbols are not obtained, no further free spins are provided to the player. Thus, there can be no limit on when the re-trigger event has to occur. The event after the triggering event in the free spin mode thus includes a terminating result and a non-terminating result based on whether the number of designated symbols are generated in a limited number of tries or activations of one or more of the reels.

In one embodiment, the outside reels remain activated to display generated combinations of symbols representing awards. Although the outside reels remain activated and are able to be spun along with the designated reels, in one embodiment, only the other two designated middle reels 34*b* and 34*d* must display wild symbols on the reels to continue the bonus game. Alternatively, the gaming device requires wild symbol 103 to be indicated on the same payline 56*b*, or another payline 56*a* or 56*c* as the wild symbol 101 to continue the bonus game.

FIG. 9B illustrates one example of an embodiment of the present invention which enables the player to accumulate awards during the re-initiation mode using one or more wild symbols. In one embodiment, the wild symbol itself does not provide an award to the player in the game. In another embodiment, an award is associated with the wild symbol and is provided to the player if the wild symbol is indicated on the reel after the reel is re-activated in the re-initiation mode. In another embodiment, the wild symbol is considered to represent any symbol for the purpose of determining if a combination of symbols exists which correspond to an award. It should be appreciated that any of the aforementioned wild symbol embodiments can be combined in a game as in the illustrated example.

In the illustrated example of one embodiment, the re-initiation mode uses the paytable used in the primary or secondary game to determine the awards associated with different symbol combinations. Alternatively, a different paytable may be used in the re-initiation mode.

Referring to FIG. 9B, two F symbols 100*f* are displayed adjacent to the wild symbol 101. The wild symbol 101, in this embodiment, represents an F for the purposes of generating a combination of three F symbols. The combination of three F symbols 100*f* in this embodiment corresponds to an award 117 of fifty according to the paytable of FIG. 3B. The award 117 of fifty is added to the previous total award 118 of seventy-five to bring the total award 118 to one-hundred twenty-five as indicated in the total award display 108. No wild symbol was generated in the first of five free spins; therefore, the gaming device re-spins or re-activates the designated reels 34*b* and 34*d* having no wild symbols displayed and the non-designated reels 34*a* and 34*e*.

In FIG. 9C, a wild symbol 103 is indicated on reel 34*d*. In one embodiment, if a wild symbol is displayed on at least one of the remaining middle reels 34*b* or 34*d*, the gaming device holds or keeps the reel stationary along with the originally indicated wild symbol 101 on reel 34*c*. Alternatively, the gaming device does not hold stationary the reel unless a wild symbol is displayed on the same payline 56*b* of at least one of the remaining middle reels 34*b* or 34*d* as the originally indicated wild symbol 101 on reel 34*c*.

Also, in FIG. 9C, two identical award symbols appear adjacent to a wild symbol. The "D" symbol 100*d* appears on the same payline on reels 34*a* and 34*b* as the wild symbol displayed on reel 34*c*. In one embodiment, this combination, according to the table in FIG. 3B, represents an award of one-hundred. The award 117 of one-hundred is added to the total award display 108 to yield a total award 118 of two hundred twenty-five.

In FIG. 9D, the gaming device generates and displays a third wild symbol 105 on the designated middle reel 34*b*. In one embodiment, the bonus game is extended when a wild symbol appears on each of the three designated reels 34*b*, 34*c* and 34*d*. Alternatively, the wild symbol must appear on an activated payline on each of the three designated reels. In a further embodiment, the wild symbols 101, 103 and 105 must appear on the same activated payline. In FIG. 9D, the presence of three wild symbols 101, 103 and 105 on the three middle reels 34*b*, 34*c* and 34*d*, extends the bonus game. As a result, in one embodiment, the player is provided additional free spins 116 to be used in the extended bonus game. The bonus game will continue until, in one embodiment, a wild symbol appears on any of the designated reels or activated or non-activated paylines. In one embodiment, the bonus game will continue until a wild symbol appears on one of the three middle reels 34*b*, 34*c* and 34*d*.

In addition to re-initiating the bonus game, in one embodiment, if the wild symbols appear on the same payline, any award symbol indicated on the same payline of the reel adjacent to the indicated wild symbols will provide a winning symbol combination according to the paytable of FIG. 3B. In FIG. 9D, because two wild symbols are on the same payline 56_b_, in an embodiment where the outside reels remain active during the re-initiation mode, an award symbol displayed on a reel on either side of the wild symbol pair will generate an award. In FIG. 9D, the "E" symbol is displayed on reel 34_a_, adjacent and on the same payline 56_b_ on reels 34_b_ and 34_c_ as the wild symbols 101 and 103. The two wild symbols in this embodiment function as symbols identical to the third adjacent symbol 100_e_. This symbol combination of three identical "E" symbols corresponds to award 117 of seventy-five in the paytable illustrated in FIG. 3B. The award 117 of seventy-five is then added to the total award display 108 to yield a total award 118 of three-hundred indicated in the total award display 118. Therefore, in this embodiment, when two wild symbols are on adjacent reels and are indicated on the same payline on both reels, the gaming device only needs to generate one award symbol adjacent to the wild symbols to win an award in the re-initiation mode. It should be appreciated that the player, in one embodiment, can qualify for more than one award based on multiple award-generating combinations on the reels.

Figure 10A:
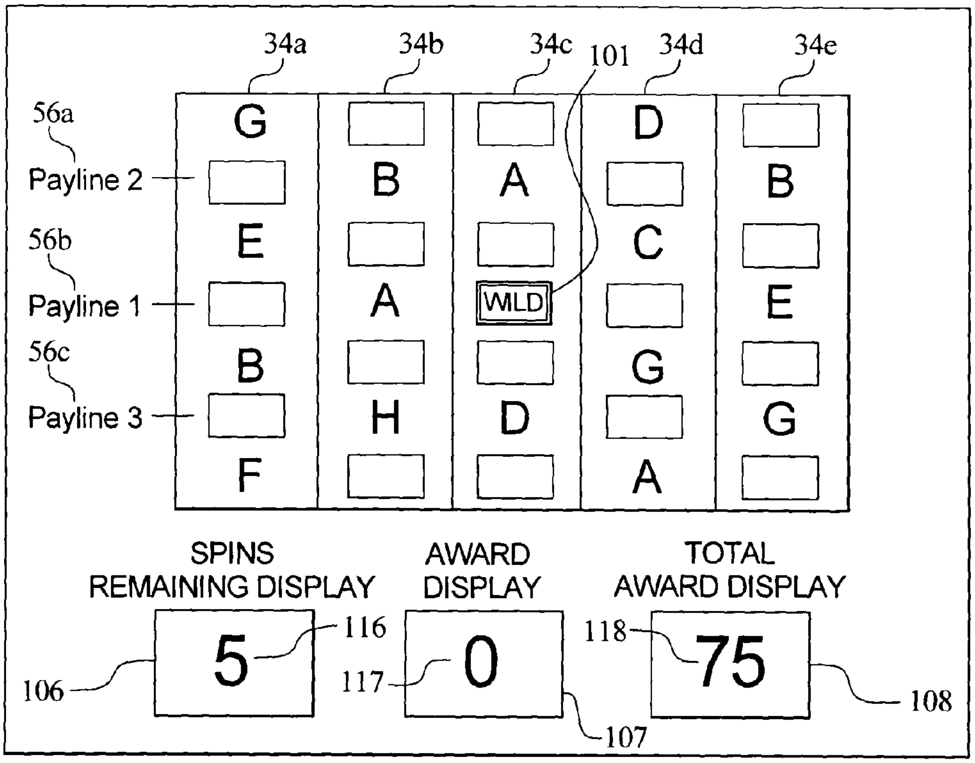
FIGS. 10A, 10*b*, 10C and 10D are enlarged front elevation views of one of the display devices of FIGS. 1A and 1B illustrating an example of one of the embodiments of the present invention where non-designated reels are locked during a re-initiation mode.

Referring now to FIGS. 10A to 10D, in an alternative embodiment, the gaming device inactivates non-designated reels reducing the number of reels to the designated reels on which to generate a symbol combination. In FIG. 10A, the display reveals the same result of the spin in FIG. 9A continued from the game in FIG. 8. The gaming device fixes, locks or holds stationary the non-designated reels 34_a_ and 34_e_ along with the designated reel 34_c_ displaying wild symbol 101. Therefore, only the other two designated reels 34_b_ and 34_d_ remain activated to determine whether a bonus game is extended and to generate awards. As in the previous embodiment, the player is provided a renewed number of five free spins. Although the gaming device provides the player five free spins to generate a wild symbol on each of the designated reels or paylines of reels 34_b_ and 34_d_, in one embodiment, the gaming device continues to provide the player awards throughout the re-initiation mode.

Figure 10B:
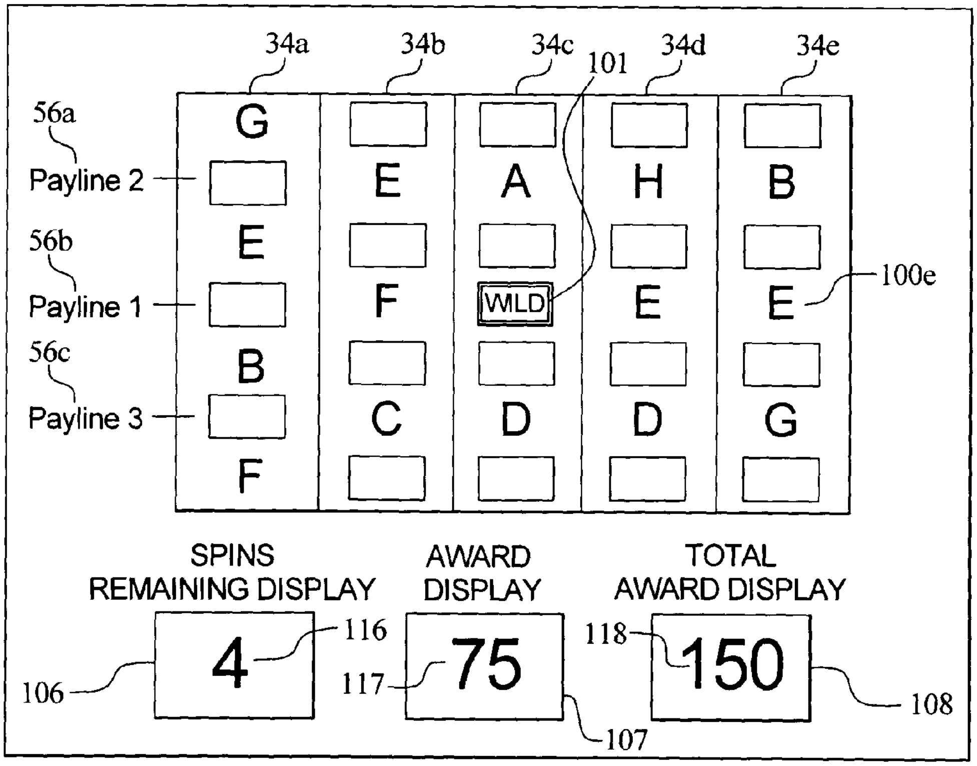

In FIG. 10B, designated reels 34_b_ and 34_d_ are reactivated or re-spun. In one embodiment, the symbols displayed on the non-designated reels are considered in determining whether a symbol combination representing an award is present. In FIG. 10B, the "E" symbol 100_e_ on reel 34_e_ combines with the "E" symbol generated on reel 34_d_ and the wild symbol 101 on reel 34_c_ to produce a combination of three "E" symbols representing an award 117 of seventy-five according to the paytable of FIG. 3B. Seventy-five is then added to the total award display 108 of FIG. 8, bringing the accumulated total award 118 to one-hundred fifty as displayed in the total award display 108.

Figure 10C:
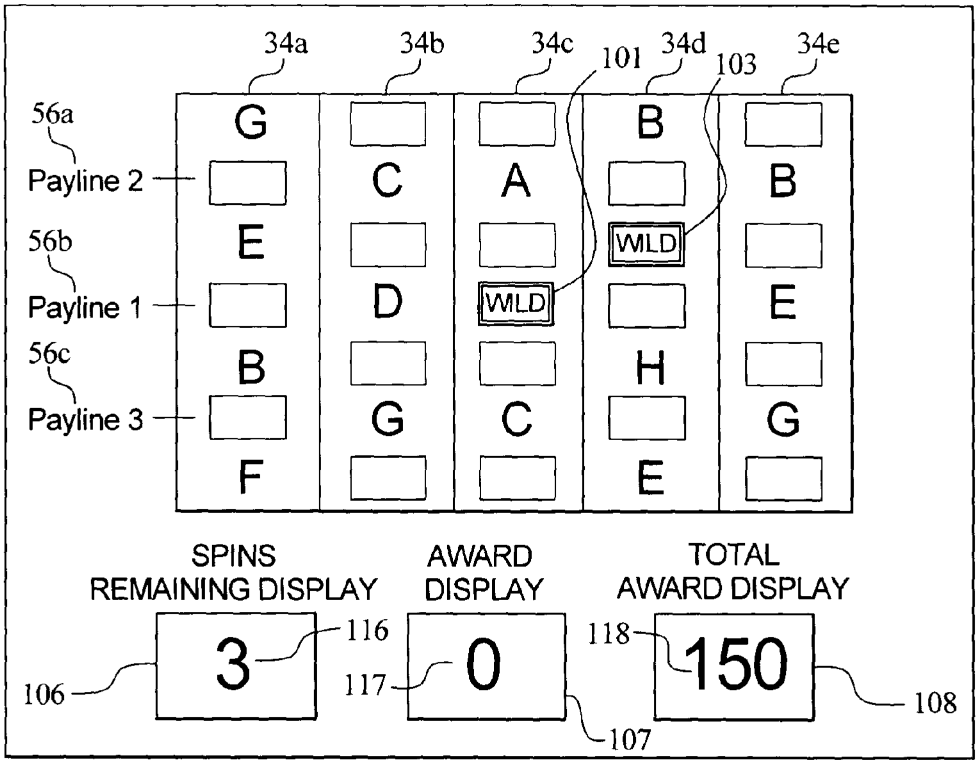

In FIG. 10C, designated reels 34_b_ and 34_d_ are reactivated or re-spun because no wild symbol was generated on either of the reels in the previous spin. In this spin, a wild symbol 103 appears on reel 34_d_ of the display and that reel is locked. The player now has three spins to generate one wild symbol on reel 34_b_ in order to reinitiate the bonus game and, in one embodiment, to receive an additional number of free spins. Because no combination of symbols representing an award according to the paytable in FIG. 3B exists, no award is provided to the player.

Figure 10D:
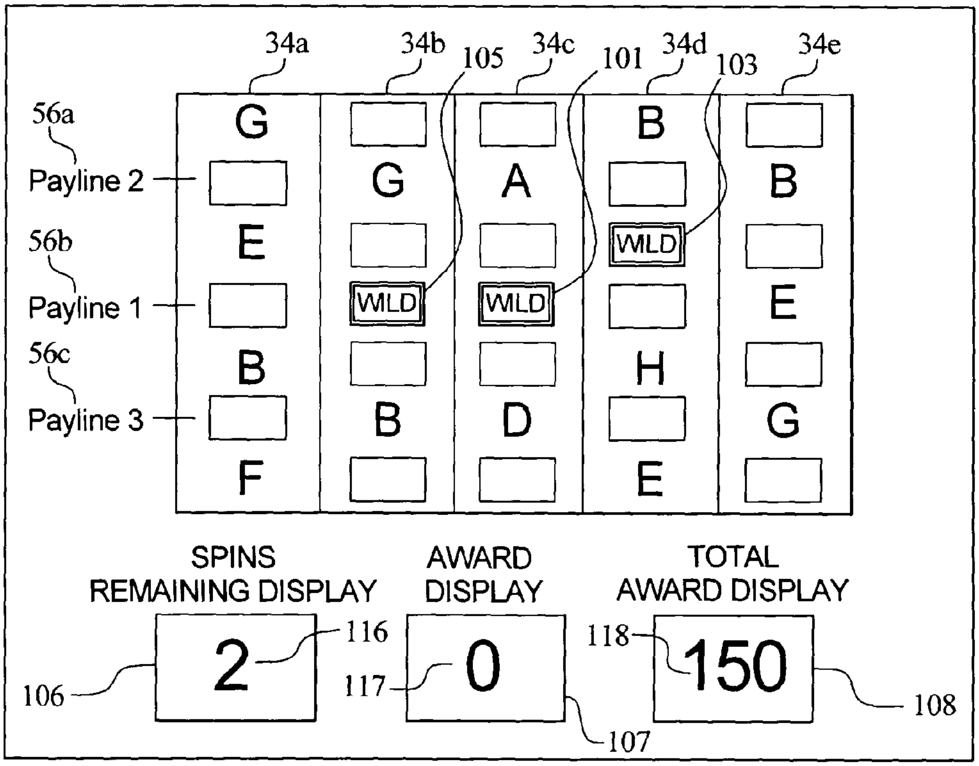

In FIG. 10D, a wild symbol is displayed on reel 34_b_. In the illustrated embodiment, the bonus game is reinitiated if a wild symbol is displayed anywhere on each of the designated reels 34_b_, 34_c_ and 34_d_. Alternatively, the wild symbols must appear on the same payline to reinitiate the bonus game. In such an embodiment, in the illustrated example of FIG. 10D, the remaining spins are used to generate a wild symbol 103 on the same payline 56_b_ on reel 34_d_ as the wild symbols 101 and 105 on reels 34_b_ and 34_c_.

It is desirable for the player, in one embodiment, for two wild symbols to appear on the same payline of the reels. The remaining activated reel can then generate an award by displaying any award symbol on the same payline as the displayed wild symbols. In the example illustrated in FIG. 10D, a null symbol or blank is indicated on the same payline 56_b_ as the two wild symbols 135 and 105 on adjacent reels. However, the gaming device does not provide an award to the player for this combination.

In one embodiment, if the bonus game is not re-initiated, the gaming device provides the player the award 118 in the total award display 108. If the bonus game is re-initiated, in one embodiment, the award 118 is added to the award display of the subsequent bonus game. In FIG. 10D, three wild symbols 101, 103 and 105 appear on the designated reels 34_b_, 34_c_ and 34_d_; therefore, the player receives an additional number of free spins or activations to be used in the base game or subsequent bonus game.

It should be appreciated that fixing or locking a reel in a position once a favorable symbol is displayed alters the probability that an award or wild symbol will be generated. As discussed above, the probability of generating a combination of award symbols is increased when the number of reels activated is decreased.

In one embodiment, only one wild symbol out of twenty symbols is present on each of three designated reels. Consequently, the probability of a wild symbol being indicated on a particular payline to begin the re-initiation mode of the game is 1 in 20 chances or 5%. Alternatively, as in the illustrated embodiment, the probability of a wild symbol being displayed anywhere on a reel, and not on a particular payline, is 7 in 20 chances or 35% (each reel displays seven of the twenty symbols for each spin). Similarly, the overall probability that two other wild symbols will be displayed on the other designated reels adjacent to the reel displaying the original wild symbol is $(7/20)\times(7/20)$, which equals $(49/400)$ or 12.25%. In contrast, in the embodiment in which the combination of wild symbols must appear on the same payline, the probability that two other wild symbols will be displayed on the same payline as the original wild symbol is $(1/20)\times(1/20)$, which equals $(1/400)$ or only 0.25%.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a game operable upon a wager by a player;

a plurality of reels in said game;

a plurality of symbols on said reels, said symbols including at least two wild symbols including one of the wild symbols on each of two of said reels;

a triggering event associated with a generation of one or more designated symbols on the reels; and a processor operable after said triggering event to:

(a) cause a generation of a plurality of the symbols on the reels without an additional wager by the player, (b) provide the player any award associated with any winning combinations of generated symbols on said reels from said generation, (c) repeat (a) and (b) until one of said wild symbols is generated on one of said reels in said generation, and (d) if one of said wild symbols is generated on one of said reels in said generation, locking the position of the reel with said wild symbol for a designated number of further generations of symbols on a designated number of other reels, wherein (i) if a designated number of other wild symbols are generated on said reels in said designated number of further generations, unlocking the position of the reels with said wild symbol and returning to (a), and (ii) if a designated number of other wild symbols are not generated on said reels in said designated number of further generations, terminating any further generations of said reels until another wager is made in the game.

2. The gaming device of claim 1, wherein each reel includes at least one wild symbol.

3. The gaming device of claim 1, wherein a plurality of different reels include a plurality of wild symbols.

4. The gaming device of claim 1, which includes a probability of generating at least one of the wild symbols on the reels associated with each of the wild symbols, wherein the probability of generating each of said wild symbols is equal.

5. The gaming device of claim 1, wherein the designated number of further generations is predetermined.

6. The gaming device of claim 1, wherein the designated number of further generations is randomly determined.

7. The gaming device of claim 1, wherein the designated number of further generations is based on the amount of the wager by the player.

8. The gaming device of claim 1, wherein the processor is operable to provide the player any award associated with any winning combinations of generated symbols on said reels from each said further generation.

9. The gaming device of claim 1, wherein if one of said wild symbols is generated on one of said reels in one of said further generations and the designated number of wild symbols has not be reached, said reel is locked, and the remaining designated number of further generations of symbols occurs on a at least one of the reels with at least one wild symbol.

10. The gaming device of claim 1, wherein each reel that generates one of said wild symbols is locked for said subsequent further generations of symbols until the designated number of other wild symbols are generated on said reels or said designated number of other wild symbols are not generated on said reels in said designated number of further generations.

11. The gaming device of claim 1, wherein the designated number of other wild symbols is at least two other wild symbols generated on said reels in said designated number of further generations.

12. The gaming device of claim 1, wherein the designated number of other reels is less than total number of said plurality of reels.

13. The gaming device of claim 1, wherein the designated number of other reels is at least two other of said plurality of reels.

14. The gaming device of claim 1, which is controlled through a through a data network.

15. The gaming device method of claim 14, wherein the data network is an internet.

16. A gaming device comprising:

a game operable upon a wager by a player;

a plurality of reels in said game;

a plurality of symbols on said reels, said symbols including at least two designated symbols including one of the designated symbols on each of two of said reels;

a triggering event associated with a generation of one or more designated symbols on the reels; and a processor operable upon said triggering event to:

(a) cause a generation of a plurality of the symbols on the reels without an additional wager by the player, (b) provide the player any award associated with any winning combinations of generated symbols on said reels from said generation, and (c) repeat (a) and (b) until one of said designated symbols is generated on one of said reels in said generation, (d) if one of said designated symbols is generated on one of said reels in said generation, locking the position of the reel with said designated symbol for a designated number of further generations of symbols on a designated number of other reels, wherein (i) if a designated number of other designated symbols are generated on said reels in said designated number of further generations, unlocking the position of the reels with said designated symbol and returning to (a), and (ii) if a designated number of other wild symbols are not generated on said reels in said designated number of further generations, terminating any further generations of said reels until another wager is made in the game.

17. The gaming device of claim 16, wherein each reel includes at least one designated symbol.

18. The gaming device of claim 16, wherein a plurality of different reels include a plurality of designate symbols.

19. The gaming device of claim 16, which includes a probability of generating at least one of the designated symbols on the reels associated with each of the designated symbols, wherein the probability of generating each of said designated symbols is equal.

20. The gaming device of claim 16, wherein the designated number of further generations is predetermined.

21. The gaming device of claim 16, wherein the designated number of further generations is randomly determined.

22. The gaming device of claim 16, wherein the designated number of further generations is based on the wager by the player.

23. The gaming device of claim 16, wherein the processor is operable to provide the player any award associated with any winning combinations of generated symbols on said reels from each said further generation.

24. The gaming device of claim 16, wherein if one of said designated symbols is generated on one of said reels in one of said further generations and the designated number of wild symbols has not been reached, said reel is locked, and the remaining designated number of further generations of symbols occurs on at least one of the reels with at least one designated symbol.

25. The gaming device of claim 16, wherein each reel that generates one of said designated symbols is locked for said subsequent further generations of symbols until the designated number of other designated symbols are generated on said reels or said designated number of other designated symbols are not generated on said reels in said designated number of further generations.

26. The gaming device of claim 16, wherein the designated number of other designated symbols is at least two other designated symbols generated on said reels in said designated number of further generations.

27. The gaming device of claim 16, wherein the designated number of other reels is less than total number of said plurality of reels.

28. The gaming device of claim 16, wherein the designated number of other reels is at least two other of said plurality of reels.

29. The gaming device of claim 16, which is controlled through a through a data network.

30. The gaming device of claim 29, wherein the data network is an internet.

31. A gaming device comprising:

a game operable upon a wager by a player;

a plurality of reels in said game;

a plurality of symbols on said reels, said symbols including at least two designated symbols including one of the designated symbols on each of two of said reels;

a triggering event associated with a generation of one or more designated symbols on the reels; and a processor operable upon said triggering event to:

(a) cause a generation of a plurality of the symbols on the reels without an additional wager by the player, (b) provide the player any award associated with any winning combinations of generated symbols on said reels from said generation, (c) repeat (a) and (b) until one of said designated symbols is generated on one of said reels in said generation, and (d) if one of said designated symbols is generated on one of said reels in said generation, locking the position of the reel with said designated symbol for a designated number of further generations of symbols on a designated number of other reels, wherein (i) if a designated number of other designated symbols are generated on said reels in said designated number of further generations, unlocking the position of the reels with said designated symbol and returning to (a), (ii) if a designated number of other wild symbols are not generated on said reels in said designated number of further generations, terminating any further generations of said reels until another wager is made in the game, (iii) wherein each reel that generates one of said designated symbols is locked for any subsequent further generations of symbols until the designated number of other designated symbols are generated on said reels or said designated number of other designated symbols are not generated on said reels in said designated number of further generations, and (iv) the player is provided any award associated with any winning combinations of generated symbols on said reels from each said further generation.

32. The gaming device of claim 31, wherein the designated number of other reels is less than total number of said plurality of reels.

33. The gaming device of claim 31, which is controlled through a through a data network.

34. The gaming device of claim 33, wherein the data network is an internet.

* * * * *

UNITED STATES PATENT AND TRADEMARK OFFICE

CERTIFICATE OF CORRECTION

PATENT NO. : 7,074,127 B2
APPLICATION NO. : 10/661443
DATED : July 11, 2006
INVENTOR(S) : Ryan W. Cuddy et al.

It is certified that error appears in the above-identified patent and that said Letters Patent is hereby corrected as shown below:

IN THE SPECIFICATION:

In column 1, line 30, change 10/086,146 Gaming Device Having a Bonus Game to --10/086146, Gaming Device Having a Varied Wild Symbol in a Bonus Game, Ser. No. 10/243,512, Gaming Device Having a Bonus Game--.

Signed and Sealed this

Twelfth Day of December, 2006

JON W. DUDAS

*Director of the United States Patent and Trademark Office*